United States Patent
Yamashita

(10) Patent No.: US 11,267,310 B2
(45) Date of Patent: Mar. 8, 2022

(54) SUSPENSION APPARATUS

(71) Applicant: HITACHI AUTOMOTIVE SYSTEMS, LTD., Hitachinaka (JP)

(72) Inventor: Mikio Yamashita, Zama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/058,362

(22) PCT Filed: May 23, 2019

(86) PCT No.: PCT/JP2019/020436
§ 371 (c)(1),
(2) Date: Nov. 24, 2020

(87) PCT Pub. No.: WO2019/230550
PCT Pub. Date: Dec. 5, 2019

(65) Prior Publication Data
US 2021/0197640 A1    Jul. 1, 2021

(30) Foreign Application Priority Data
May 29, 2018 (JP) .............................. JP2018-102703

(51) Int. Cl.
*B60G 21/06* (2006.01)
(52) U.S. Cl.
CPC ................................... *B60G 21/06* (2013.01)
(58) Field of Classification Search
CPC .... B60G 21/067; B60G 21/073; B60G 21/06; B60G 17/08; F16F 9/3214; F16F 9/103; F16F 9/3207
See application file for complete search history.

(56) References Cited

U.S. PATENT DOCUMENTS 3,328,019 A * 6/1967 Wilson ................. B60G 21/073
267/186
3,752,497 A * 8/1973 Enke .................. B60G 17/0152
280/5.509

(Continued)

FOREIGN PATENT DOCUMENTS

DE          4441812 A1 *  5/1996  ................ F16F 9/48
DE       19853873 A1 *  5/2000  ........... B60G 21/073

(Continued)

OTHER PUBLICATIONS

Machine Translation of FR2892975 (Year: 2007).*
(Continued)

*Primary Examiner* — Paul N Dickson
*Assistant Examiner* — Kurtis Nielson
(74) *Attorney, Agent, or Firm* — Wenderoth, Lind & Ponack, L.L.P.

(57) ABSTRACT

A suspension apparatus includes a pair of hydraulic cylinders and a valve device provided between an upper chamber and a lower chamber of each of the hydraulic cylinders and configured to establish and block communication between these chambers. The valve device includes a first passage and an extension-side damping force generation mechanism. Hydraulic oil flows out from the upper chamber into the first passage due to movement of a piston in a cylinder of the hydraulic cylinder. The extension-side damping force generation mechanism includes a damping valve and a back-pressure chamber. The damping valve is disposed in the first passage and generates a damping force by restricting a flow of the hydraulic oil generated due to a sliding movement of the piston. The back-pressure chamber applies an inner pressure thereof to the damping valve in a valve-closing direction.

4 Claims, 12 Drawing Sheets

(56) References Cited

U.S. PATENT DOCUMENTS

| | | | | | |
|---|---|---|---|---|---|
| 4,270,771 | A | * | 6/1981 | Fujii | B60G 17/033 267/64.19 |
| 5,201,389 | A | * | 4/1993 | Miller | B60G 17/08 188/282.5 |
| 5,794,966 | A | * | 8/1998 | MacLeod | B60G 21/067 280/124.104 |
| 6,202,805 | B1 | * | 3/2001 | Okada | F16F 9/3214 188/266.2 |
| 6,293,377 | B1 | * | 9/2001 | Okada | F16F 9/3207 188/266.5 |
| 6,364,332 | B1 | * | 4/2002 | Kutsche | B60G 17/04 280/124.16 |
| 6,390,257 | B1 | * | 5/2002 | Naples | F16F 9/3214 188/281 |
| 6,460,663 | B1 | * | 10/2002 | Huang | F16F 9/3214 188/266.5 |
| 6,556,907 | B1 | * | 4/2003 | Sakai | B60G 17/056 280/124.1 |
| 6,761,371 | B1 | | 7/2004 | Heyring et al. | |
| 2005/0001401 | A1 | * | 1/2005 | Heyring | B60G 21/10 280/124.157 |
| 2008/0018030 | A1 | * | 1/2008 | Kiriyama | B60G 21/06 267/140.11 |
| 2015/0247547 | A1 | * | 9/2015 | Yamashita | F16F 9/32 188/313 |
| 2016/0223047 | A1 | * | 8/2016 | Kim | F16F 9/16 |
| 2017/0307044 | A1 | * | 10/2017 | Yamashita | F16F 9/185 |
| 2018/0259029 | A1 | * | 9/2018 | Yamashita | F16F 9/3415 |
| 2018/0355941 | A1 | * | 12/2018 | Yuno | F16F 9/461 |
| 2020/0191229 | A1 | * | 6/2020 | Mori | F16F 9/446 |
| 2020/0370616 | A1 | * | 11/2020 | Kim | F16F 9/3487 |

FOREIGN PATENT DOCUMENTS

| | | | | | |
|---|---|---|---|---|---|
| FR | 2892975 | A1 | * | 5/2007 | F16F 9/06 |
| JP | 4674882 | | | 4/2011 | |
| JP | 2015-120364 | | | 7/2015 | |
| KR | 20110026173 | A | * | 3/2011 | |
| WO | WO-2008141387 | A1 | * | 11/2008 | F16F 9/28 |
| WO | WO-2013047143 | A1 | * | 4/2013 | B60G 21/073 |
| WO | WO-2015078190 | A1 | * | 6/2015 | B60G 21/067 |

OTHER PUBLICATIONS

International Search Report dated Jul. 23, 2019 in International Application No. PCT/JP2019/020436, with English Translation.
Written Opinion of the International Searching Authority dated Jul. 23, 2019 in International Application No. PCT/JP2019/020436, with English Translation.

* cited by examiner

SUSPENSION APPARATUS

TECHNICAL FIELD

The present invention relates to a suspension apparatus preferably used to absorb a vibration of, for example, a two-wheeled or four-wheeled automobile.

BACKGROUND ART

Generally, it is known that a vehicle such as a four-wheeled automobile is equipped with a suspension apparatus including hydraulic cylinders provided between left and right wheel sides and a vehicle body side and configured to absorb, for example, a vertical vibration and a lateral roll vibration (rolling) generated when the vehicle is running. One example of such a suspension apparatus is an equalizing-type suspension apparatus in which cross conduits are laid to connect respective upper chambers and lower chambers of the left and right hydraulic cylinders to each other with the aim of accomplishing both the runability of the vehicle on a bad-conditioned road and the handling and stability of the vehicle on a good-conditioned road (for example, refer to PTLs 1 and 2).

CITATION LIST

Patent Literature

[PTL 1] Japanese Patent No. 4674882
[PTL 2] Japanese Patent Application Public Disclosure No. 2015-120364

SUMMARY OF INVENTION

Technical Problem

However, the suspension apparatus according to the conventional technique, like the examples discussed in the above-described patent literatures, PTLs 1 and 2, has such a problem that the ride comfort on the vehicle cannot be necessarily improved, for example, when the vehicle runs straight on a bad-conditioned road although high roll stiffness can be achieved, for example, when inputs opposite in phase from each other are generated on the left and right wheels. On the other hand, adding an electronic control system like PTL 2 raises a problem of necessitating high cost for the system and also leading to the complication of the system.

Solution to Problem

An object of the present invention is to provide a suspension apparatus capable of achieving roll stiffness suitable to a running condition of a vehicle and accomplishing both handling/stability and ride comfort.

To achieve the above-described object, a configuration according to one aspect of the present invention includes a pair of hydraulic cylinders disposed between left and right wheels and a vehicle body or a pair of hydraulic cylinders disposed between front and rear wheels and a vehicle body with an inside of each of the cylinders divided into an upper chamber and a lower chamber by a piston, a first connection conduit connecting the pair of hydraulic cylinders therebetween in a cross manner in such a manner that the upper chamber of one of the hydraulic cylinders is in communication with the lower chamber of the other of the hydraulic cylinders, a second connection conduit connecting the pair of hydraulic cylinders therebetween in a cross manner in such a manner that the upper chamber of the other of the hydraulic cylinders is in communication with the lower chamber of the one of the hydraulic cylinders, and a valve device provided between the upper chamber and the lower chamber of each of the hydraulic cylinders and configured to establish and block communication between the upper chamber and the lower chamber or provided between the first connection conduit and the second connection conduit and configured to establish and block communication between the first connection conduit and the second connection conduit. The valve device includes a first passage configured to allow hydraulic fluid to flow therein due to a movement of the piston, and a damping force generation mechanism including a damping valve and a back-pressure chamber. The damping valve is disposed in the first passage and configured to generate a damping force by restricting a flow of the hydraulic fluid generated due to a sliding movement of the piston. The back-pressure chamber is configured to apply an inner pressure thereof to this damping valve in a valve-closing direction. The damping force generation mechanism includes a back-pressure chamber inflow passage configured to introduce the hydraulic fluid from the first passage into the back-pressure chamber. The damping valve includes a first valve configured to open and close an opening of the first passage and abut against the piston, and a back-pressure chamber adjustment mechanism configured to adjust the inner pressure in the back-pressure chamber. The back-pressure chamber adjustment mechanism includes a cylindrical case member and a free piston. The cylindrical case member is arranged with at least a part of a second passage formed therein. The free piston is disposed in the case member and divides an inside of the case member into two chambers. One of the two chambers is in communication with the back-pressure chamber, and the free piston blocks at least a flow toward one side in the second passage.

According to the one aspect of the present invention, the suspension apparatus can accomplish both the handling/stability and the ride comfort.

DESCRIPTION OF EMBODIMENTS

In the following description, suspension apparatuses according to embodiments of the present invention will be described in detail with reference to the accompanying drawings based on examples in which the suspension apparatuses are applied to a four-wheeled automobile.

Figure 1:
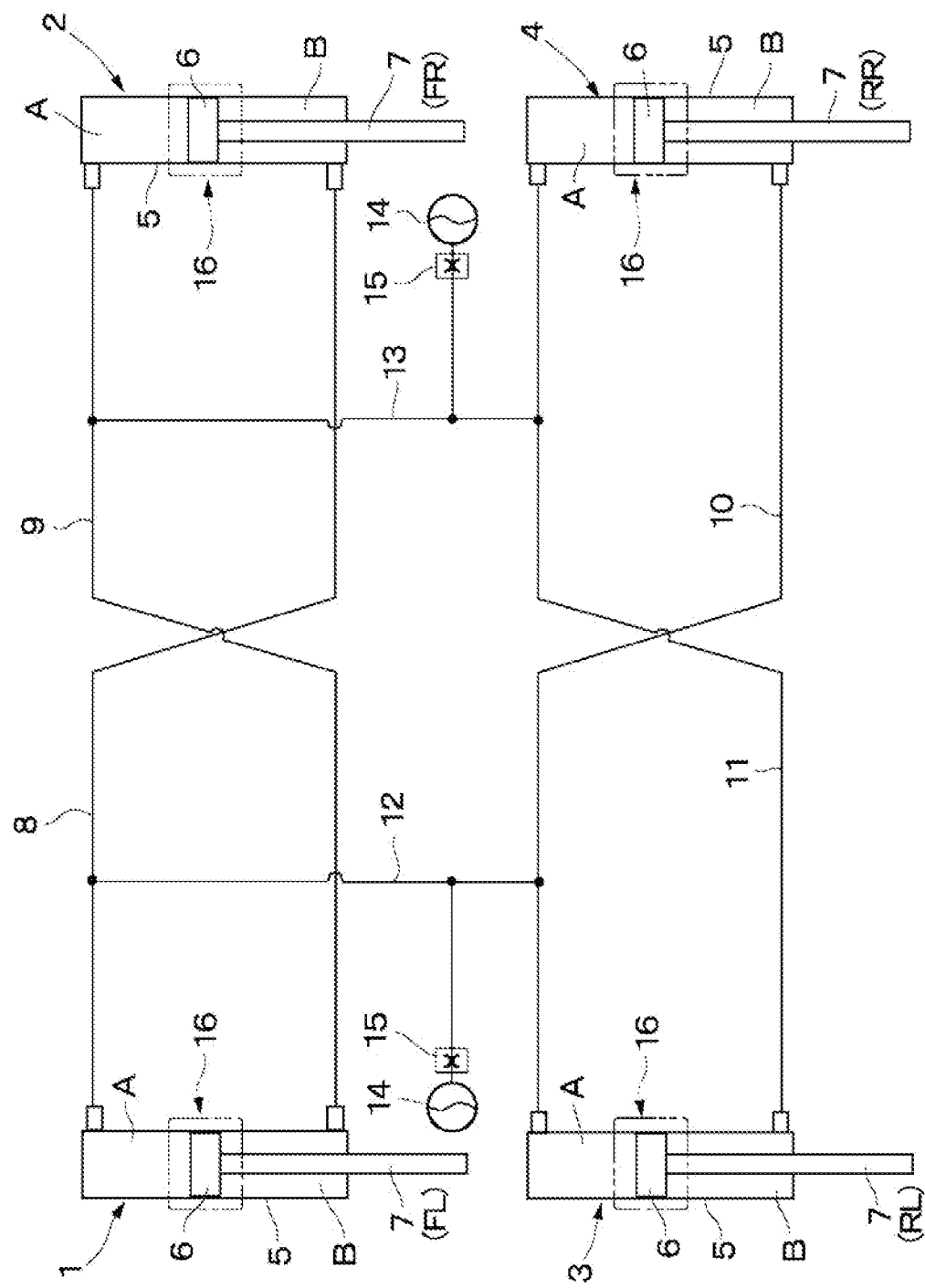
FIG. 1 illustrates the overall configuration of a suspension apparatus according to a first embodiment.

First, FIGS. 1 to 9 illustrate a first embodiment of the present invention. In FIG. 1, left and right hydraulic cylinders (hereinafter referred to as a left hydraulic cylinder 1 on the front wheel side and a right hydraulic cylinder 2 on the front wheel side) are disposed between front left and right wheels and a vehicle body of a vehicle (any of them is not illustrated), respectively. Left and right hydraulic cylinders on the rear side (hereinafter referred to as a left hydraulic cylinder 3 on the rear wheel side and a right hydraulic cylinder 4 on the rear wheel side) are disposed between rear left and right wheels and the vehicle body of the vehicle (any of them is not illustrated), respectively. In FIG. 1, indexes are added to indicate the respective wheel positions of the vehicle, like the front left wheel (FL), the front right wheel (FR), the rear left wheel (RL), and the rear right wheel (RR).

These hydraulic cylinders 1 to 4 are each a cylinder device disposed between the vehicle body (a sprung side) and each of the wheels (an unsprung side) of the vehicle and configured to extend and compress according to a relative movement between the vehicle body and each of the wheels, and constitute a shock absorber that absorbs a vibration of the above-described vehicle. For example, the left hydraulic cylinder 1 on the front left wheel side includes a cylinder 5, a piston 6, and a piston rod 7. The cylinder 5 is made of a bottomed tubular tube. The piston 6 is slidably and fittedly inserted in this cylinder 5. The piston rod 7 has one end side fixed to the piston 6 and the opposite end side protruding out of the cylinder 5. The inside of the cylinder 5 is divided into upper and lower two chambers A and B (i.e., an upper chamber A, and a lower chamber B) by the piston 6.

Similarly thereto, each of the other hydraulic cylinders 2, 3, and 4 also includes the cylinder 5, the piston 6, and the piston rod 7. Then, in each of the hydraulic cylinders 2, 3, and 4, the inside of the cylinder 5 is divided into the upper chamber A and the lower chamber B by the piston 6. In each of the hydraulic cylinders 1 to 4, a valve device 16, which will be described below, is provided between the upper chamber A and the lower chamber B via the piston 6 and the piston rod 7 in the cylinder 5.

First and second connection conduits 8 and 9 are provided between the left hydraulic cylinder 1 and the right hydraulic cylinder 2 on the front wheel side as cross conduits, and connect these hydraulic cylinders therebetween in a cross manner. The first connection conduit 8 of these conduits is laid while laterally extending between the hydraulic cylinders 1 and 2 so as to establish communication between the upper chamber A of the left hydraulic cylinder 1 and the lower chamber B of the right hydraulic cylinder 2. The second connection conduit 9 is laid while laterally extending between the hydraulic cylinders 1 and 2 so as to establish communication between the lower chamber B of the left hydraulic cylinder 1 and the upper chamber A of the right hydraulic cylinder 2.

Further, the left hydraulic cylinder 3 and the right hydraulic cylinder 4 on the rear wheel side are connected to each other via first and second connection conduits 10 and 11 as cross conduits therebetween in a cross manner. More specifically, the first connection conduit 10 is laid while laterally extending between the hydraulic cylinders 3 and 4 so as to establish communication between the upper chamber A of the left hydraulic cylinder 3 and the lower chamber B of the right hydraulic cylinder 4. The second connection conduit 11 is laid while laterally extending between the hydraulic cylinders 3 and 4 so as to establish communication between the lower chamber B of the left hydraulic cylinder 3 and the upper chamber A of the right hydraulic cylinder 4.

A left-side communication passage 12 is a conduit that establishes constant communication between the connection conduit 8 on the front side and the connection conduit 10 on the rear side at a position close to the left hydraulic cylinder 1 on the front wheel side and the left hydraulic cylinder 3 on the rear wheel side. A right-side communication passage 13 is a conduit that establishes constant communication between the connection conduit 9 on the front side and the connection conduit 11 on the rear side at a position close to the right hydraulic cylinder 2 on the front wheel side and the right hydraulic cylinder 4 on the rear wheel side.

An accumulator 14 as an accumulation device and a restrictor valve 15 are provided on the way of the left-side communication passage 12. The accumulator 14 and the restrictor valve 15 are also provided on the way of the right-side communication passage 13. Each of the respective restrictor valves 15 generates a damping force with the aid of resistance from the restriction to absorb the extension/compression operation of each of the hydraulic cylinders 1 to 4, when hydraulic oil (hydraulic fluid) enters and exits (flows) between the above-described communication passage 12 or 13 and the accumulator 14. The insides of the hydraulic cylinders 1 to 4, the connection conduits 8 to 11, and the communication passages 12 and 13 are filled with the hydraulic oil (liquid as the hydraulic fluid).

Next, the specific configuration of the valve device 16 will be described with reference to FIGS. 2 to 6. The valve device 16 is provided between the upper chamber A and the lower chamber B in each of the hydraulic cylinders 1 to 4, and establishes and blocks communication between the upper chamber A and the lower chamber B.

Now, the valve device 16 includes a first passage (for example, oil passages 6A and 6B and a passage in a cylindrical case member 22) and a damping force generation mechanism (an extension-side damping force generation mechanism 21). The hydraulic oil as the hydraulic fluid flows out from the upper chamber A into the first passage due to a movement of the piston 6 in the cylinder 5 (i.e., extension and compression of the piston rod 7 from and into the cylinder 5) of each of the hydraulic cylinders 1 to 4. The damping force generation mechanism includes a damping valve and a back-pressure chamber 23. The damping valve is disposed in the above-described first passage, and generates a damping force by restricting a flow of the hydraulic oil generated due to a sliding movement of the piston 6. The back-pressure chamber 23, which will be described below, applies an inner pressure thereof to this damping valve in a valve-closing direction.

The above-described damping force generation mechanism includes a back-pressure chamber inflow passage 31. The back-pressure chamber inflow passage 31 introduces the hydraulic oil (the hydraulic fluid) from the above-described first passage to the back-pressure chamber 23. The back-pressure chamber inflow passage 31 will be described below. The above-described damping valve includes a first valve (a pressure control valve 24, which will be described below) and a second valve (a free valve 25, which will be described below). The first valve opens and closes the opening of the above-described first passage formed at the piston 6, and abuts against the piston 6. The second valve adjusts the inner pressure in the back-pressure chamber 23.

Figure 2:
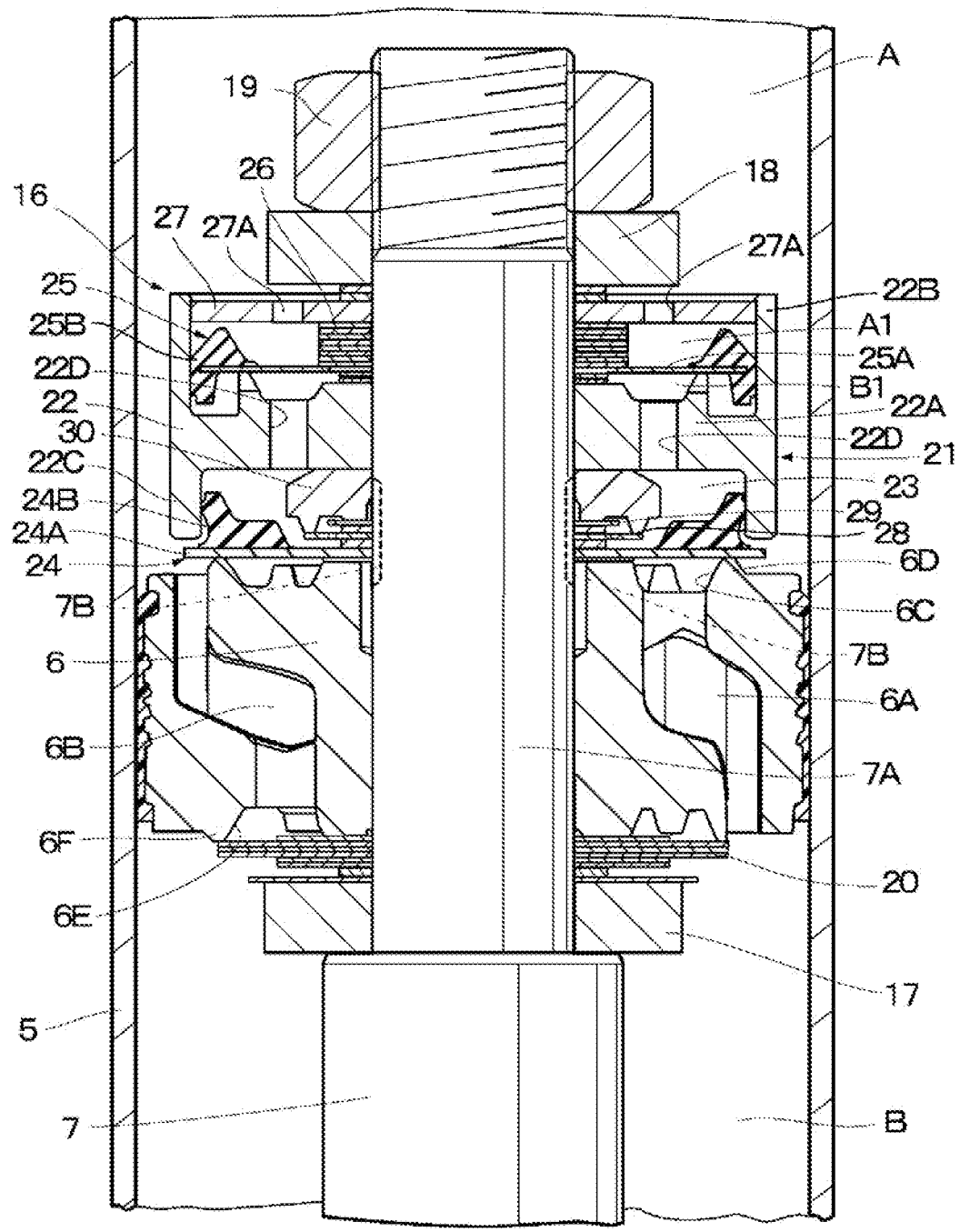
FIG. 2 is a vertical cross-sectional view illustrating the specific structure of a valve device provided in each of hydraulic cylinders illustrated in FIG. 1.
Figure 3:
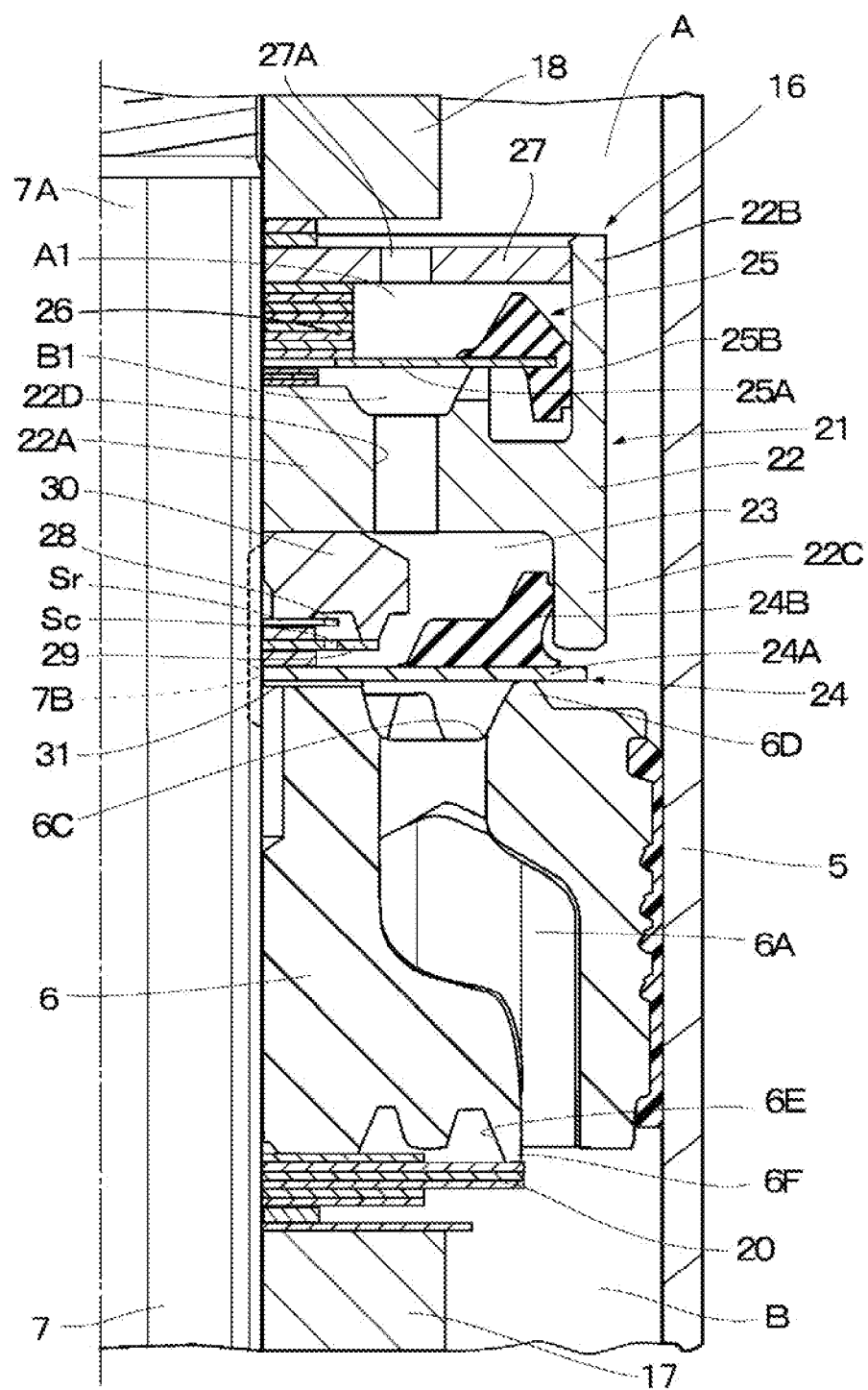
FIG. 3 is a half cross-sectional view illustrating the valve device illustrated in FIG. 2 in an enlarged manner.

As illustrated in FIGS. 2 and 3, a plurality of oil passages 6A and a plurality of oil passages 6B are each formed on the piston 6 so as to be circumferentially spaced apart from one another. The oil passages 6A and 6B can establish the communication between the upper chamber A and the lower chamber B. These oil passages 6A and 6B constitute the first passage, in which the hydraulic oil flows between the upper chamber A and the lower chamber B in the cylinder 5. An annular recessed portion 6C and an annular valve seat 6D are provided on the end surface of the piston 6 on the upper side thereof. The annular recessed portion 6C is formed so as to surround the openings of the oil passages 6A on the upper side. The annular valve seat 6D is positioned on the radially outer side of this annular recessed portion 6C. A main disk 24A, which will be described below, is seated on and separated from the annular valve seat 6D. An annular recessed portion 6E and an annular valve seat 6F are provided on the end surface of the piston 6 on the lower side thereof. The annular recessed portion 6E is formed so as to surround the openings of the oil passages 6B on the lower side. The annular valve seat 6F is positioned on the radially outer side of this annular recessed portion 6E. A compression-side damping force generation mechanism 20 (i.e., a disk valve), which will be described below, is seated on and separated from the annular valve seat 6F.

The piston rod 7 includes a small-diameter rod portion 7A on one end side (the upper end side) thereof, and the piston 6 is fixed to this small-diameter rod portion 7A via spacers 17 and 18 and the like using a nut 19 in a fastened state. The opposite end side (the lower end side) of the piston rod 7 protrudes out from the cylinder 5 via a rod guide (not illustrated) and the like. The nut 19 serves to attach the piston 6 to the small-diameter rod portion 7A of the piston rod 7 in a threadably engaged state and also fix the compression-side and extension-side damping force generation mechanisms 20 and 21, which will be described below, on both the upper and lower surface sides of the piston 6 by fastening them in a detachably attachable manner.

A communication groove 7B is formed on the outer peripheral surface of the small-diameter rod portion 7A of the piston rod 7 so as to axially extend. The communication groove 7B is constantly in communication with the annular recessed portion 6C of the piston 6. The communication groove 7B is shaped like a width across flats. This communication groove 7B is in communication with the back-pressure chamber 23, which will be described below, via first and second orifices Sr and Sc (disks 28 and 29), and constitutes a part of the back-pressure chamber inflow passage 31. A pressure difference is generated between the communication groove 7B and the back-pressure chamber 23 due to, for example, a restrictor effect of the first orifice Sr. Now, the communication groove 7B is constructed by forming a width across flats on the outer peripheral surface of the small-diameter rod portion 7A. The communication groove 7B is constructed in this manner for the purpose of preventing the disks 28 and 29 and the like from being misaligned in the radial direction of the small-diameter rod portion 7A while forming the communication groove 7B as a communication groove. In other words, the communication groove 7B may be shaped like a width with one flat or may be formed throughout the entire circumference by providing a mechanism for preventing the disks 28 and 29 from being misaligned in the radial direction, as long as the communication groove 7B is configured to be able to prevent the radial misalignment of the disks 28 and 29.

The compression-side damping force generation mechanism 20 includes the disk valve provided between the end surface of the piston 6 on the lower side (the annular recessed portion 6E) and the spacer 17 so as to close the oil passages 6B of the piston 6 toward the lower chamber B. This compression-side damping force generation mechanism 20 serves to apply a resistance force to the hydraulic oil flowing from the upper chamber A toward the lower chamber B via each of the oil passages 6B and the annular recessed portion 6E of the piston 6 to generate a compression-side damping force according to a predetermined characteristic, when the piston 6 is slidably displaced upward in the cylinder 5 during the compression stroke of the piston rod 7.

The extension-side damping force generation mechanism 21 is attached to the upper side of the piston 6 in a fixed state at a position in the upper chamber A of the cylinder 5 as illustrated in FIG. 2. The extension-side damping force generation mechanism 21 serves to apply a resistance force to the hydraulic oil flowing from the lower chamber B toward the upper chamber A via each of the oil passages 6A and the annular recessed portion 6C of the piston 6 and the like to generate an extension-side damping force according to a predetermined characteristic, when the piston 6 is slidably displaced downward in the cylinder 5 during the extension stroke of the piston rod 7.

Then, the damping valve of the extension-side damping force generation mechanism 21 includes the pressure control valve 24 as the first valve and a back-pressure chamber adjustment mechanism that adjusts the inner pressure in the back-pressure chamber 23. This back-pressure chamber adjustment mechanism includes the cylindrical case member 22 (i.e., a case member), the free valve 25 (i.e., the second valve as a free piston working as a frequency adaptive valve), which will be described below, and the like. The cylindrical case member 22 is fixed to the outer peripheral side of the piston rod 7 (the small-diameter portion 7A) at a position between the piston 6 and the spacer 18, and has an H-like shape in cross section. The pressure control valve 24 includes an elastic seal member 24B, and corresponds to the first valve forming the annular back-pressure chamber 23 between the pressure control valve 24 and the cylindrical case member 22. The elastic seal member 24B is fitted to the lower surface side of the cylindrical case member 22 (the inner peripheral surface of an opposite-side cylindrical portion 22C, which will be described below) with a tightening margin. The elastic seal member 24B will be described below.

The cylindrical case member 22 as the case member of the extension-side damping force generation mechanism 21 includes an annular plate portion 22A, a short one-side cylindrical portion 22B, the short opposite-side cylindrical portion 22C, and a plurality of through-holes 22D. The annular plate portion 22A is provided by being fitted to the outer peripheral side of the small-diameter rod portion 7A. The one-side cylindrical portion 22B is provided so as to extend upward from the outer peripheral side of this annular plate portion 22A to one axial side. The opposite-side cylindrical portion 22C is provided so as to extend downward from the outer peripheral side of the annular plate portion 22A to the opposite axial side. The through-holes 22D are formed by piercing a radially intermediate portion of the annular plate portion 22A so as to establish communication of the inside of the one-side cylindrical portion 22B with the inside of the opposite-side cylindrical portion 22C, and are opened vertically. These through-holes 22D constitute a second passage provided in the cylindrical case member 22 together with a damper upper chamber A1 and a damper lower chamber B1, which will be described below.

The pressure control valve 24 includes the main disk 24A and the annular elastic seal member 24B. The main disk 24A is seated onto and separated from the annular valve seat 6D of the piston 6. The elastic seal member 24B is provided by being fixedly attached to the outer peripheral side of the upper surface of this main disk 24A using a method such as vulcanization and baking. This elastic seal member 24B is formed into a thick ring shape with use of an elastic material such as rubber, and liquid-tightly seals the back-pressure chamber 23 on the inner side with respect to the outer upper chamber A (i.e., between the elastic seal member 24B and the opposite-side cylindrical portion 22C).

The pressure control valve 24 serves to generate the predetermined extension-side damping force with the main disk 24A thereof separated from the annular valve seat 6D when the pressure difference increases to a predetermined valve-opening set pressure between the lower chamber B (the annular recessed portion 6C) and the back-pressure chamber 23 (i.e., the inner side of the opposite-side cylindrical portion 22C) during the extension stroke of the piston rod 7. When the pressure control valve 24 (the main disk 24A) is opened, the upper chamber A and the lower chamber B are in communication with each other via the oil passages 6A of the piston 6 therebetween. On the other hand, when the pressure control valve 24 (the main disk 24A) is closed, for example, the hydraulic oil in the lower chamber B is introduced from the oil passages 6A and the annular recessed portion 6C of the piston 6 into the back-pressure chamber 23 via the communication groove 7B of the piston rod 7 (the small-diameter rod portion 7A), the orifices Sr and Sc of the disks 28 and 29, which will be described below, and the like.

The back-pressure chamber adjustment mechanism of the extension-side damping force generation mechanism 21 includes the free valve 25 as the free piston provided in the one-side cylindrical portion 22B of the cylindrical case member 22. This free valve 25 includes a disk valve 25A and an annular elastic seal member 25B. The disk valve 25A of the free valve 25 is mounted in the one-side cylindrical portion 22B of the cylindrical case member 22 via a plurality of valve seat disks 26 and a cover plate 27, and is configured as a check valve member that is seated on and separated from the outer peripheral sides of the valve seat disks 26.

The elastic seal member 25B of the free valve 25 is provided by being fixedly attached to the outer peripheral side of the disk valve 25A using a method such as vulcanization and baking. This elastic seal member 25B is formed into a thick ring shape with use of an elastic material such as rubber, and is in liquid-tight contact with the inner peripheral surface of the one-side cylindrical portion 22B with a tightening margin. Due to this configuration, the inside of the one-side cylindrical portion 22B of the cylindrical case member 22 is divided into two chambers, the frequency adaptive damper upper chamber A1 and damper lower chamber B1 by the free valve 25.

Then, the volume in the damper lower chamber B1 increases and reduces according to displacements (including elastic deformations) of the disk valve 25A and the elastic seal member 25B. Therefore, the free valve 25 is configured as the back-pressure chamber adjustment mechanism (the second valve) that adjusts the pressure (the inner pressure) in the back-pressure chamber 23. The cover plate 27 is provided by being fitted between the outer peripheral side of the small-diameter rod portion 7A and the inner peripheral side of the one-side cylindrical portion 22B, and is sandwiched between the valve seat disks 26 and the spacer 18 with the aid of the fastening force from the nut 19. A plurality of through-holes 27A is formed vertically by piercing a radially intermediate portion of the cover plate 27. These through-holes 27A are communication holes that establish constant communication of the inside of the one-side cylindrical portion 22B of the cylindrical case member 22 (the damper upper chamber A1) with the outer upper chamber A.

The disk valve 25A of the free valve 25 as the check valve member is kept seated on the outer peripheral sides of the valve seat disks 26 during the extension stroke of the piston rod 7, and is relatively displaced so as to be moved vertically or stopped in the one-side cylindrical portion 22B according to a vibration frequency of the piston rod 7 and/or the cylinder 5 in this state. Due to this configuration, the free valve 25 has a function of operating as the frequency adaptive valve that adjusts the inner pressure in the damper lower chamber B1 (i.e., the back-pressure chamber 23) according to the above-described frequency.

However, during the compression stroke of the piston rod 7, the damper upper chamber A1 has a higher pressure relative to the damper lower chamber B1, and therefore the free valve 25 is opened in such a manner that the disk valve 25A as the check valve member is separated from the outer peripheral sides of the valve seat disks 26. As a result, the hydraulic oil (the hydraulic fluid) in the upper chamber A flows from the damper upper chamber A1 toward the damper lower chamber B1, the through-holes 22D, and the back-pressure chamber 23 in a direction indicated by an arrow C in FIG. 4.

The plurality of disks 28 and 29, and the like are provided in the opposite-side cylindrical portion 22C of the cylindrical case member 22 via a retainer 30. The disks 28 and 29 form the first and second orifices Sr and Sc serving as variable orifices between the opposite-side cylindrical portion 22C and the main disk 24A of the pressure control valve 24. Now, the disks 28 and 29 are disposed while being vertically stacked on each other between the main disk 24A and the retainer 30, and are sandwiched between the main disk 24A and the retainer 30 by fastening the nut 19 to the distal end (upper end) side of the small-diameter rod portion 7A.

The disk 28 on the upper side is formed as an annular disk having a smaller outer diameter dimension than the disk 29 on the lower side, and the first orifice Sr is formed at a radially inner portion thereof. The first orifice Sr is constantly in communication with the communication groove 7B of the piston rod 7 (the small-diameter portion 7A). The disk 29 on the lower side is formed as a check valve member seated on and separated from the lower surface side of the retainer 30, and the second orifice Sc is formed at a radially intermediate portion thereof. The second orifice Sc is constantly in communication with the back-pressure chamber 23. The second orifice Sc has a smaller orifice area than the first orifice Sr.

Figure 4:
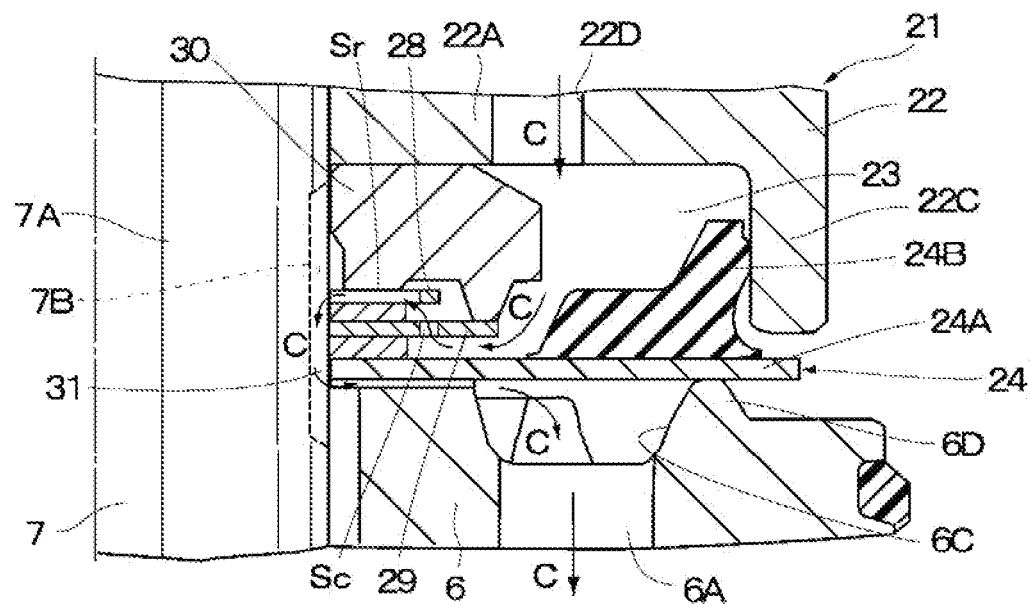
FIG. 4 is an enlarged view illustrating main portions in FIG. 3 with hydraulic oil flowing through first and second orifices during a compression stroke of a piston rod.
Figure 5:
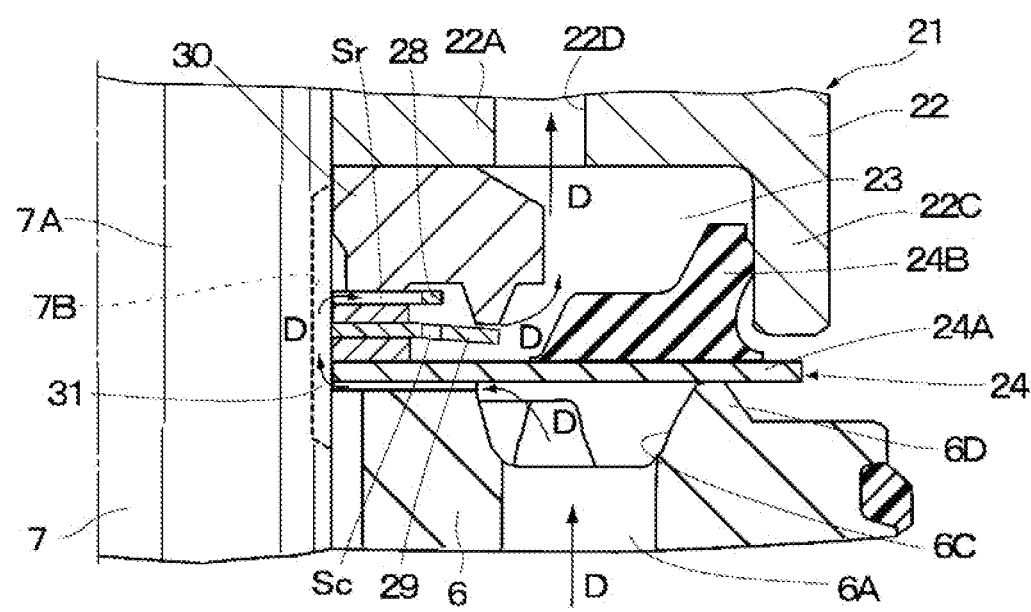
FIG. 5 is an enlarged view illustrating the main portions in FIG. 3 with the hydraulic oil flowing through the first orifice during an extension stroke of the piston rod.
Figure 6:
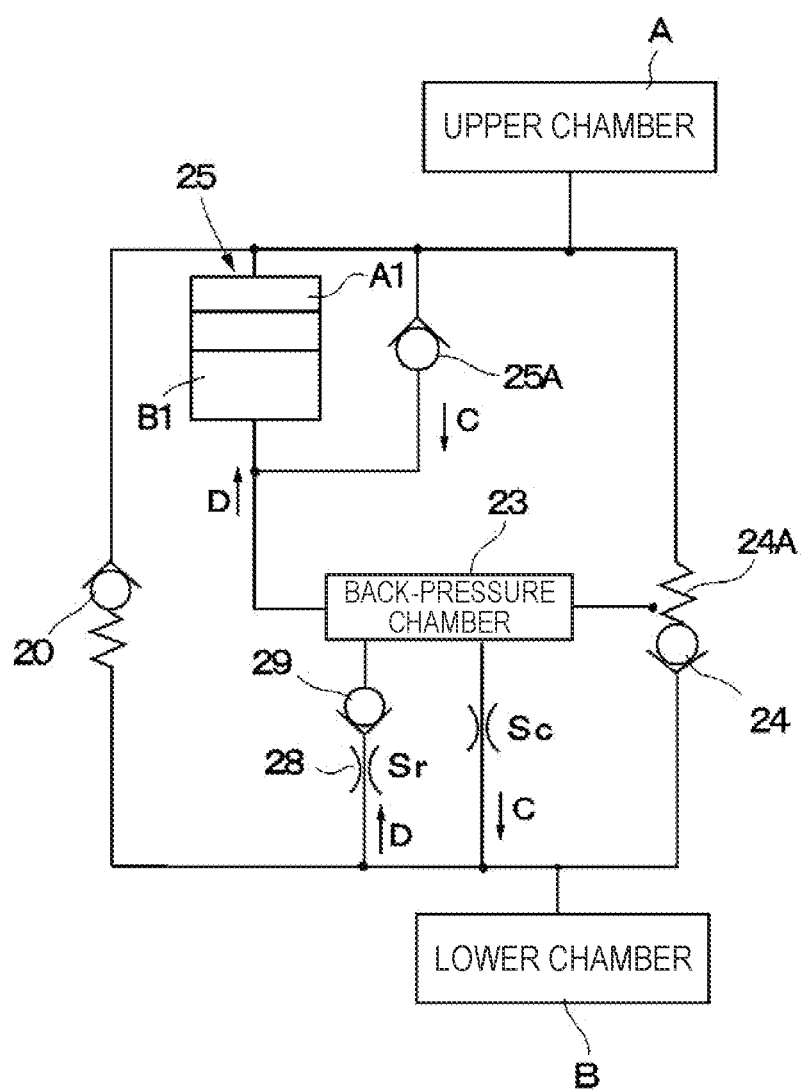
FIG. 6 is a hydraulic circuit diagram illustrating the operations of compression-side and extension-side damping force generation mechanisms of the valve device.

The first orifice Sr of the disk 28 and the second orifice Sc of the disk 29 constitute the back-pressure chamber inflow passage 31, which introduces the hydraulic oil into the back-pressure chamber 23, together with the communication passage 7B of the piston rod 7 (the small-diameter rod portion 7A). During the extension stroke of the piston rod 7, as illustrated in FIG. 5, the disk valve 29 as the check valve member is opened and the hydraulic oil at this time flows in a direction indicated by an arrow D and is subjected to restriction on the flow amount (the orifice area of the flow passage) thereof due to the first orifice Sr of the disk 28. During the compression stroke of the piston rod 7, as illustrated in FIG. 4, the disk 29 as the check valve is kept closed and the hydraulic oil at this time flows in the direction indicated by the arrow C and is subjected to restriction on the flow amount (the orifice area of the flow passage) thereof due to the second orifice Sc of the disk 29.

In this manner, the back-pressure chamber inflow passage 31 is equipped with the first and second orifices Sr and Sc that make a difference in the flow amount of the hydraulic oil (the orifice area) between the extension stroke and the compression stroke of the piston rod 7. The orifice area of the first orifice Sr of the disk 28 is larger than the second orifice Sc of the disk 29 (Sr>Sc). Therefore, the flow amount of the hydraulic oil flowing in the back-pressure chamber inflow passage 31 (for example, the communication groove 7B of the small-diameter rod portion 7A) is smaller during the compression stroke than during the extension stroke of the piston rod 7. However, during the extension stroke of the piston rod 7, the hydraulic oil flows in the direction indicated by the arrow D in FIG. 5 only in a range where the volume in the damper lower chamber B1 increases due to the displacements (including the elastic deformations) of the disk valve 25A and the elastic seal member 25B.

The suspension apparatus according to the first embodiment is configured in the above-described manner, and the operation thereof will be described next.

First, the hydraulic cylinders 1 to 4 are mounted in such a manner that the protruding end (the lower end) of each of the piston rods 7 is attached to the wheel side and the bottom portion (the upper end illustrated in FIG. 1) side of each of the cylinders 5 is attached to the vehicle body side of the vehicle. The upper chambers A and the lower chambers B are connected in the cross manner via the first and second connection conduits 8 and 9 as the cross conduits between the left hydraulic cylinder 1 and the right hydraulic cylinder 2 on the front wheel side. The upper chambers A and the lower chambers B are connected in the cross manner via the first and second connection conduits 10 and 11 as the cross conduits between the left hydraulic cylinder 3 and the right hydraulic cylinder 4 on the rear wheel side.

Due to this configuration, when the vehicle is running, the individual piston rods 7 are displaced so as to extend from and compress into the respective cylinders 5 and the individual pistons 6 are vertically and slidably displaced in the respective cylinders 5 at the left and right hydraulic cylinders 1 and 2 on the front wheel side and the left and right hydraulic cylinders 3 and 4 on the rear wheel side, for example, upon occurrence of a vertical vibration due to unevenness of a road surface or the like or occurrence of a rocking vibration such as pitching and rolling.

Therefore, the hydraulic oil enters and exits (flows) between the left-side and right-side communication passages 12 and 13 and the left and right accumulators 14, and, at this time, the respective restrictor valves 15 generate the damping forces with the aid of resistance due to the restriction against the hydraulic oil flowing therein, thereby being able to absorb the extension/compression operations of the hydraulic cylinders 1 to 4. As a result, the hydraulic cylinders 1 to 4 can secure roll stiffness, for example, when inputs opposite in phase from each other are generated on the left and right wheels, thereby acquiring roll stiffness suitable to the running condition of the vehicle.

In addition, the valve devices 16 are provided between the upper chambers A and the lower chambers B of the respective cylinders 5 on the left and right hydraulic cylinders 1 and 2 on the front wheel side and the left and right hydraulic cylinders 3 and 4 on the rear wheel side, respectively. These valve devices 16 each include the first passage (for example, the oil passages 6A and 6B and the passage in the cylindrical case member 22), the extension-side damping force generation mechanism 21, and the compression-side damping force generation mechanism 20. The hydraulic oil flows out from the upper chamber A into the first passage due to the movement of each of the pistons 6 in the respective cylinders 5 of the hydraulic cylinders 1 to 4. The extension-side damping force generation mechanism 21 includes the damping valve and the back-pressure chamber 23. The damping valve is disposed in the above-described first passage, and generates the damping force by restricting the flow of the hydraulic oil generated due to the sliding movement of the piston 6. The back-pressure chamber 23 applies the inner pressure thereof to this damping valve in the valve-closing direction.

The extension-side damping force generation mechanism 21 includes the back-pressure chamber inflow passage 31, which introduces the hydraulic oil from the above-described first passage to the back-pressure chamber 23. The back-pressure chamber inflow passage 31 is equipped with the first and second orifices Sr and Sc (the disks 28 and 29) that make a difference in the flow amount of the hydraulic oil (the orifice area) between the extension stroke and the compression stroke of the piston rod 7. The above-described damping valve includes the pressure control valve 24 and the back-pressure chamber adjustment mechanism. The pressure control valve 24 opens and closes the opening of the above-described first passage formed at the piston 6, and abuts against the piston 6. The back-pressure chamber adjustment mechanism adjusts the inner pressure in the back-pressure chamber 23. This back-pressure chamber adjustment mechanism includes the case member (the cylindrical case member 22) and the free valve 25.

During the compression stroke of the piston rod 7, the disk valve 25A of the free valve 25 is opened so as to be separated from the outer peripheral sides of the valve seat disks 26, and the hydraulic oil (the hydraulic fluid) in the upper chamber A flows from the damper upper chamber A1 toward the damper lower chamber B1, the through-holes 22D, and the back-pressure chamber 23 in the direction indicated by the arrow C in FIG. 4. At this time, the disk 29 as the check valve member is kept closed, and the hydraulic oil flowing in the direction indicated by the arrow C is subjected to the restriction on the flow amount thereof due to the second orifice Sc of the disk 29. During the extension stroke of the piston rod 7, as illustrated in FIG. 5, the disk 29 as the check valve member is opened and the hydraulic oil at this time flows in the direction indicated by the arrow D and is subjected to the restriction on the flow amount thereof due to the first orifice Sr of the disk 28.

With the first and second orifices Sr and Sc provided in this manner, the orifice area of the second orifice Sc of the disk 29 is smaller than the first orifice Sr of the disk 28 (Sc<Sr). Therefore, during the compression stroke of the piston rod 7, a large damping force can be generated due to the hydraulic oil flowing through the second orifice Sc of the disk 29, and the above-described roll stiffness of each of the hydraulic cylinders 1 to 4 can be enhanced based on the damping force at this time. In this case, with the aid of the second orifice Sc of the disk 29, the roll stiffness can be secured according to the orifice area thereof.

On the other hand, during the extension stroke of the piston rod 7, the volume in the damper lower chamber B1 increases due to the displacements (including the elastic deformations) of the disk valve 25A and the elastic seal member 25B of the free valve 25. The hydraulic oil flows in the direction indicated by the arrow D in FIG. 5 in this increase range. Therefore, the pressure in the back-pressure chamber 23 reduces due to the displacement of the free valve 25, and the valve-opening set pressure of the pressure control valve 24 reduces according thereto. As a result, the axial force (the characteristic of the generated damping force) of the pressure control valve 24 of the extension-side damping force generation mechanism 21 is switched from a hard state to a soft state between before and after a cutoff frequency fc as indicated by a characteristic line 32 illustrated in FIG. 7.

In this manner, the free valve 25 operates as the frequency adaptive valve that adjusts the inner pressure in the damper lower chamber B1 (i.e., the back-pressure chamber 23) according to the vibration frequency of the piston rod 7 and/or the cylinder 5. In this case, the above-described cutoff frequency fc is a frequency determined according to the first orifice Sr of the disk 28, and is preferably set to, for example, equal to or lower than rolling resonance (frequency) around 1 Hz.

Figure 7:
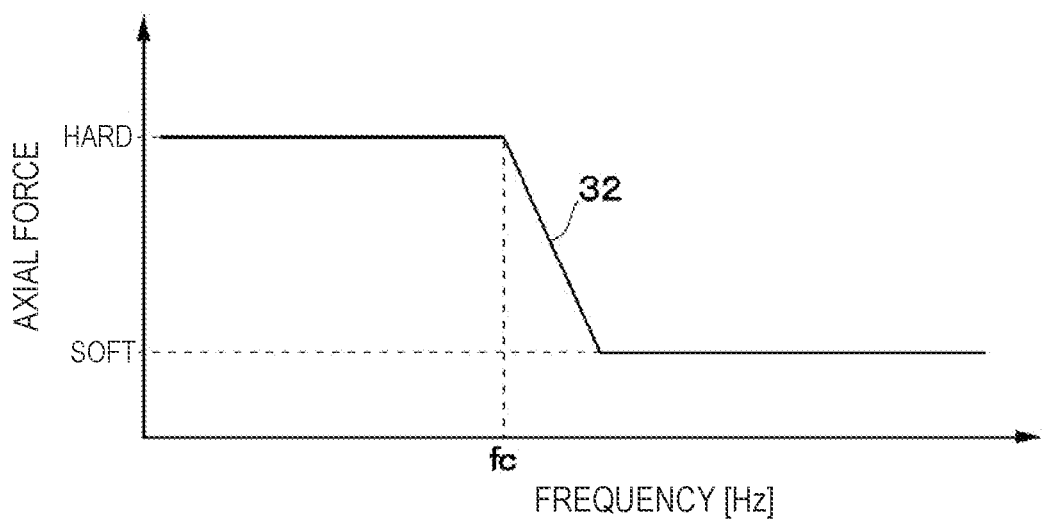
FIG. 7 illustrates a characteristic line representing the relationship between an axial force of the hydraulic cylinder and a vibration frequency.

Due to this configuration, the pressure control valve 24 of the extension-side damping force generation mechanism 21 keeps the axial force (the characteristic of the generated damping force) of each of the hydraulic cylinders 1 to 4 in the hard state when the vibration frequency of the piston rod 7 and/or the cylinder 5 is lower than the cutoff frequency fc (for example, a low-frequency range in a handling and stability region such as a lane change) as indicated by the characteristic line 32 illustrated in FIG. 7. In other words, the pressure in the back-pressure chamber 23 does not reduce due to the free valve 25 and the valve-opening set pressure of the pressure control valve 24 is relatively kept at a high pressure at this time. This results in a success to enhance the roll stiffness of each of the hydraulic cylinders 1 to 4, thereby contributing to suppressing a roll, for example, when the vehicle is turning.

Further, at the time of a high frequency when the above-described vibration frequency exceeds the cutoff frequency fc (for example, when the vehicle is running on a bad-conditioned road), the pressure in the back-pressure chamber 23 reduces due to the free valve 25 and the valve-opening set pressure of the pressure control valve 24 reduces, so that the axial force (the characteristic of the generated damping force) of each of the hydraulic cylinders 1 to 4 is switched to the soft state. This results in a success to reduce the roll stiffness of each of the hydraulic cylinders 1 to 4 to a low level at the time of the high frequency (for example, when the vehicle is running on the bad-conditioned road), thereby contributing to cutting an uncomfortable frequency component impairing the ride comfort on the vehicle.

In this manner, according to the first embodiment, the suspension apparatus includes the free valve 25 as the frequency adaptive valve that adjusts the inner pressure in the damper lower chamber B1 (the back-pressure chamber 23) according to the vibration frequency of the piston rod 7 and/or the cylinder 5. The back-pressure chamber inflow passage 31, which introduces the hydraulic oil into the back-pressure chamber 23, is equipped with the first and second orifices Sr and Sc (the disks 28 and 29) that make a difference in the flow amount of the hydraulic oil (the orifice area) between the extension stroke and the compression stroke of the piston rod 7.

The first orifice Sr of the disk 28, which is one of the two orifices, is a factor that determines the cutoff frequency fc so as to control the free valve 25 as the frequency adaptive valve to allow the oil to flow only at the time of a high-frequency change in the hydraulic oil during the extension stroke, and the orifice area of the first orifice Sr is adjusted in such a manner that the cutoff frequency fc matches an appropriate frequency according to the vehicle type so as to fall between sprung resonance and rolling resonance. Due to this adjustment, the cutoff frequency fc illustrated in FIG. 7 is set to match or fall below, for example, the rolling resonance (frequency) around 1 Hz due to the first orifice Sr (the orifice area) of the disk 28.

On the other hand, during the compression stroke of the piston rod 7 in which the free valve 25 does not operate as the frequency adaptive valve, the orifice area of the second orifice Sc during the compression stroke is set to a sufficiently small area so as to reduce the flow amount of the hydraulic oil flowing in the passage of the piston 6 (from the back-pressure chamber 23 to the oil passages 6B via the first and second orifices Sr and Sc, the communication groove 7B, and the annular recessed portion 6C) as much as possible to maintain a roll angle equivalent to the existing suspension system, with the aim of securely maintaining the roll stiffness (for example, prevent an increase in the roll angle at the time of a steady-state circular test) based on the axial force (the characteristic of the generated damping force) of each of the hydraulic cylinders 1 to 4.

In this manner, for the first orifice Sr, which is the one having the larger orifice area of the first and second orifices Sr and Sc (the disks 28 and 29) provided in the back-pressure chamber inflow passage 31, it is desirable to increase the orifice area thereof to an appropriate degree to cause the free valve 25 to operate as the frequency adaptive valve during the extension stroke of the piston rod 7. On the other hand, it is desirable to set the orifice area of the second orifice Sc so as to sufficiently reduce it to maintain the roll angle during the compression stroke in which the free valve 25 does not operate as the frequency adaptive valve.

The suspension apparatus according to the first embodiment is configured in the above-described manner, thereby being able to suppress a sprung vibration due to the rolling resonance when the vehicle is running on the bad-conditioned road while maintaining the high roll stiffness of the suspension system, thus allowing the vehicle to improve the ride comfort thereon, without use of an electronic controller that turns off the suspension system function such as a bridge valve. Especially, the free valve 25 can improve the ride comfort when the vehicle equipped with the suspension system is running on the bad-conditioned road without use of electronic control, by mechanically adjusting the flow amount of the hydraulic oil according to the vibration frequency of the vehicle in cooperation with the first and second orifices Sr and Sc provided in the back-pressure inflow passage 31.

Figure 8:
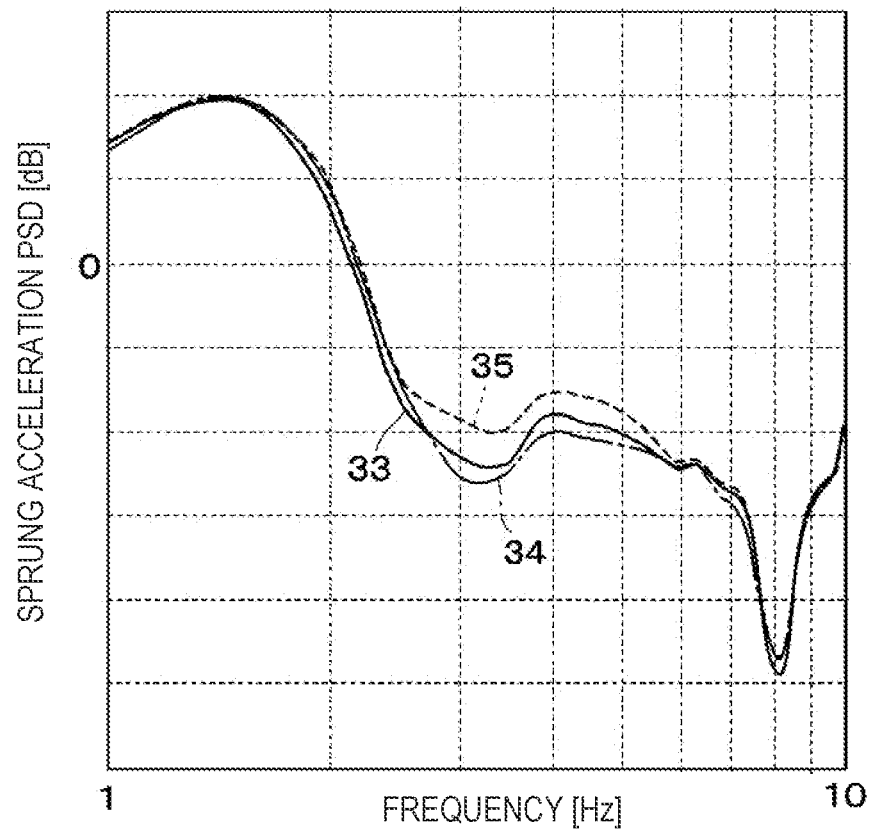
FIG. 8 illustrates characteristic lines each representing the characteristic of a vertical acceleration on a sprung side of an automobile with respect to the vibration frequency.
Figure 9:
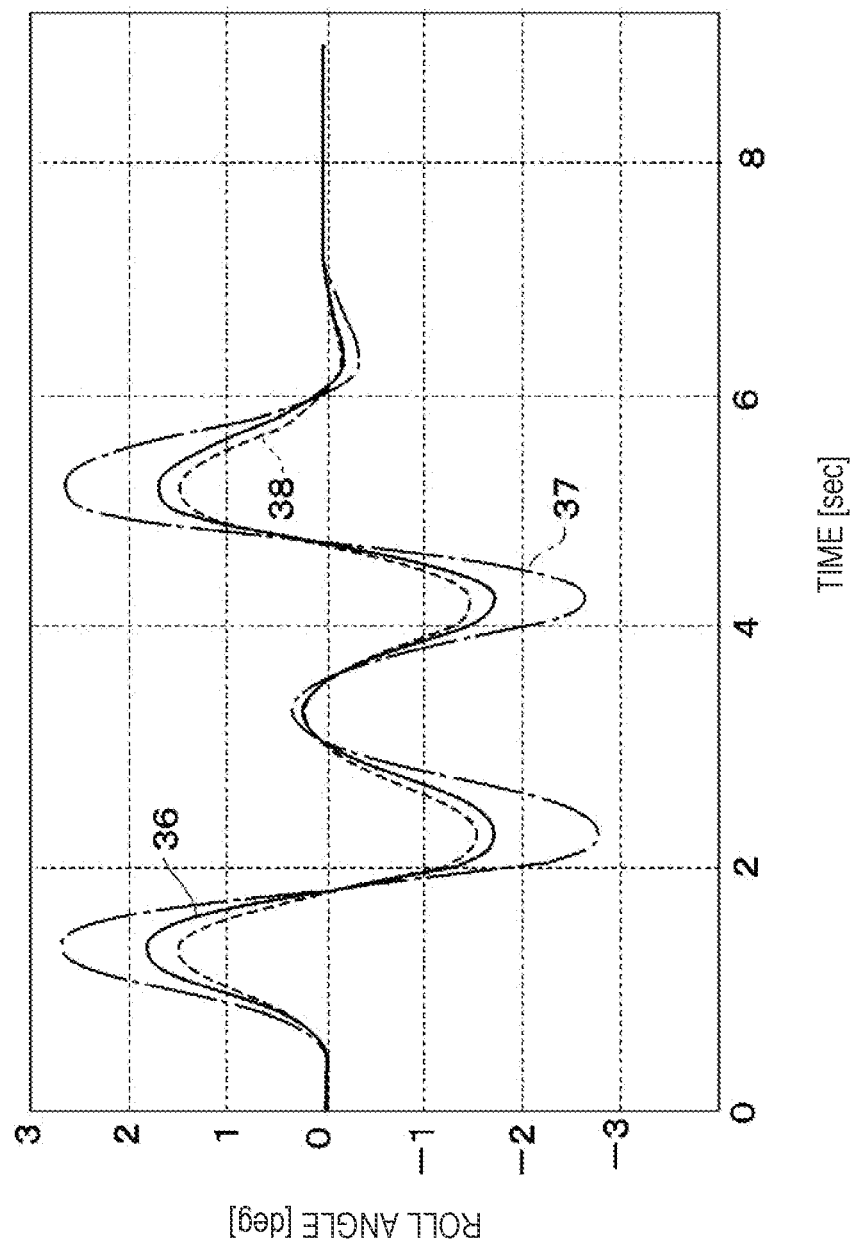
FIG. 9 illustrates characteristic lines each representing the characteristic of a roll angle when the vehicle is running in a timing chart.

Now, FIGS. 8 and 9 illustrate vehicle simulation results when the suspension apparatus according to the first embodiment is applied to an actual vehicle. FIG. 8 illustrates a simulation in which the ride comfort on the vehicle is evaluated when the vehicle ran on a bad-conditioned road at, for example, 60 km/h. A characteristic line 33 indicated by a solid line in FIG. 8 represents the PSD value of the sprung acceleration according to the present embodiment as the relationship with the vibration frequency. A characteristic line 34 indicated by a long dashed short dashed line in FIG. 8 represents the characteristic when the bridge valve is added and is controlled by the electronic control.

On the other hand, a characteristic line 35 indicated by a dotted line in FIG. 8 represents the PSD value of the sprung acceleration according to the existing suspension system neither equipped with the bridge valve nor performing the electronic control as the relationship with the vibration frequency. It can be confirmed that, as seen from the characteristic line 33 indicated by the solid line in FIG. 8, the suspension apparatus according to the present embodiment is able to improve the ride comfort on the vehicle compared to the conventional technique represented by the characteristic line 35 indicated by the dotted line, and is able to achieve ride comfort closer to the ride comfort level of the characteristic line 34 using the electronic control by the mechanical valve device 16 (for example, the frequency adaptive free valve 25) even without relying on the electronic control.

Further, FIG. 9 illustrates a simulation in which a roll behavior of the vehicle is evaluated when the vehicle conducts a double lane change and back at a running speed of, for example, 100 km/h, and a characteristic line 36 indicated by a solid line in FIG. 9 represents the characteristic of a change in the roll angle over time according to the present embodiment. A characteristic line 37 indicated by a long dashed short dashed line in FIG. 9 represents the characteristic when the bridge valve is added and is controlled by the electronic control. On the other hand, a characteristic line 38 indicated by a dotted line in FIG. 9 represents the characteristic of the roll angle according to the existing suspension system neither equipped with the bridge valve nor performing the electronic control.

As seen from the long dashed short dashed line in FIG. 9, the characteristic line 37 using the electronic control undesirably leads to an increase in the roll angle unless the bridge valve is switched to OFF by the electronic control at the time of the lane change. However, it can be confirmed that, as seen from the characteristic line 36 indicated by the solid line in FIG. 9, the suspension apparatus according to the present embodiment is able to achieve a closer roll angle at the time of the handling and stability to the existing suspension system (the characteristic line 38 indicated by the dotted line) while improving the ride comfort without relying on the electronic control.

Therefore, according to the first embodiment, the suspension apparatus can improve the problem with the existing suspension system (for example, the unsatisfactory ride comfort on the bad-conditioned road) by mechanically adjusting the flow amount of the hydraulic oil according to the vibration frequency of the vehicle, thereby improving the ride comfort on the vehicle at low cost while avoiding the complication of the system without relying on the electronic control.

Figure 10:
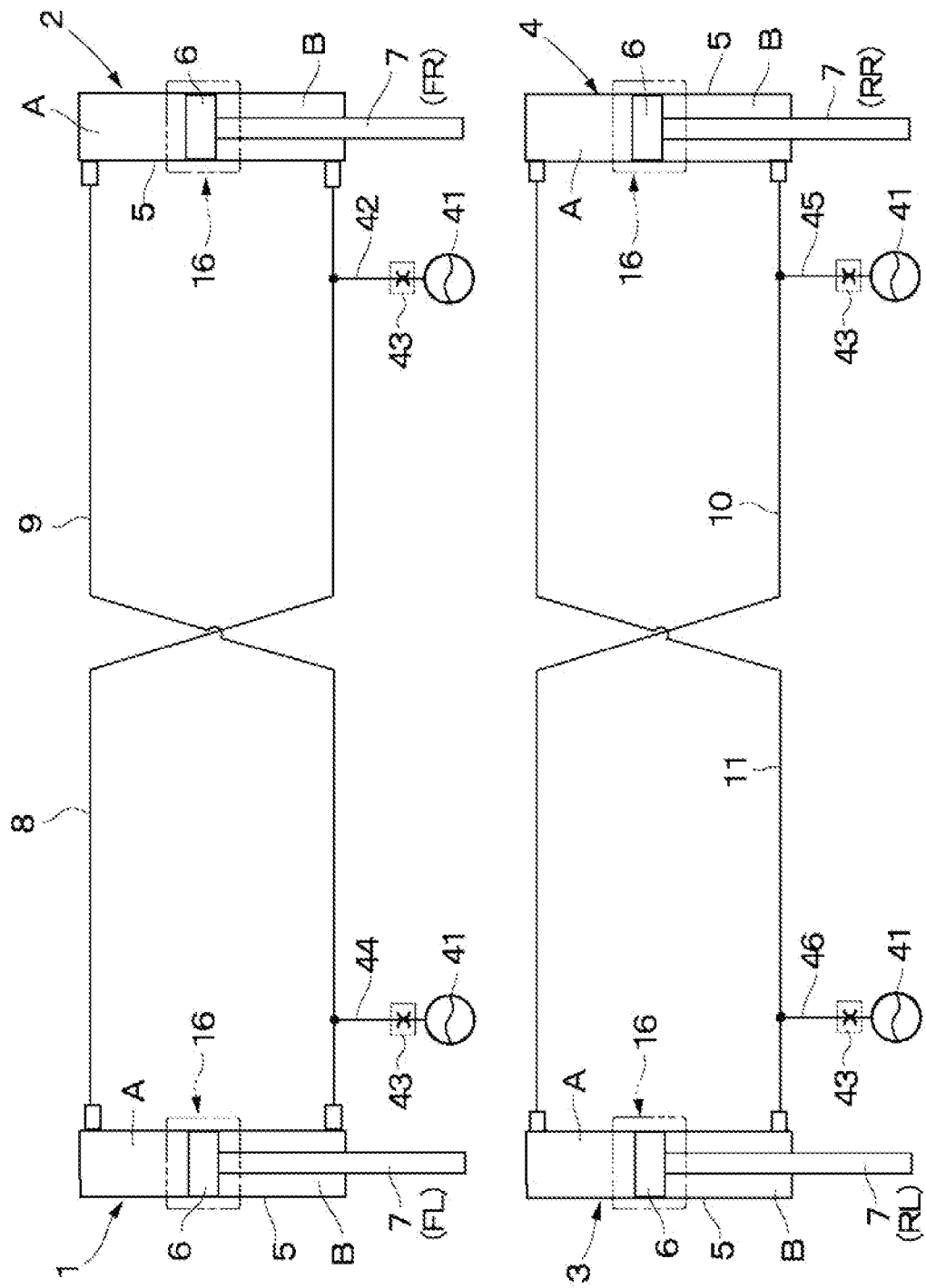
FIG. 10 illustrates the overall configuration of a suspension apparatus according to a second embodiment.

Next, FIG. 10 illustrates a second embodiment of the present invention. The second embodiment is characterized by being configured to connect the connection conduits as the cross conduits to accumulators via individual conduits, respectively, and provide restrictor valves on the way of the individual conduits, respectively. The second embodiment will be described, identifying similar components to the above-described first embodiment by the same reference numerals and omitting descriptions thereof.

Now, the connection conduit 8 on the front side is connected to an accumulator 41 via a conduit 42. A restrictor valve 43 is provided in this conduit 42 at a position between the connection conduit 8 and the accumulator 41. Further, the connection conduit 9 on the front side is connected to another accumulator 41 via a conduit 44. The restrictor valve 43 is provided in this conduit 44 at a position between the connection conduit 9 and the accumulator 41.

On the other hand, the connection conduit 10 on the rear side is connected to another accumulator 41 via a conduit 45. The restrictor valve 43 is provided in this conduit 45 at a position between the connection conduit 10 and the accumulator 41. Further, the connection conduit 11 on the rear side is connected to another accumulator 41 via a conduit 46. The restrictor valve 43 is provided in this conduit 46 at a position between the connection conduit 11 and the accumulator 41.

The respective accumulators 41 connected at the distal end sides of the conduits 42, 44, 45, and 46 constitute the accumulator similarly to the accumulator 14 described in the first embodiment, but the accumulators 41 in this case are individually connected to the distal end sides of the conduits 42, 44, 45, and 46, respectively. Further, the restrictor valves 43 provided on the way of the conduits 42, 44, 45, and 46 are configured in a similar manner to the restrictor valve 15 described in the first embodiment. The respective restrictor valves 43 generate damping forces with the aid of the resistance from the restriction to absorb the extension/compression operations of the hydraulic cylinders 1 to 4, when the hydraulic oil (the hydraulic fluid) enters and exits (flows) between the respective conduits 42, 44, 45, and 46 and accumulators 41. The insides of the hydraulic cylinders 1 to 4, the connection conduits 8 to 11, and the conduits 42, 44, 45, and 46 are filled with the hydraulic oil (the liquid as the hydraulic fluid).

In this manner, the thus-configured second embodiment can also acquire approximately similar advantageous effects to the above-described first embodiment, and can improve the ride comfort when the vehicle equipped with the suspension system is running on the bad-conditioned road without relying on the electronic control. However, according to the second embodiment, the suspension apparatus can generate the damping forces individually by the respective restrictor valves 43 to absorb the extension/compression operations of the hydraulic cylinders 1 to 4 when the hydraulic oil (the hydraulic fluid) enters and exits (flows) between the conduits 42, 44, 45, and 46 and the respective accumulators 41.

Next, FIGS. 11 to 15 illustrate a third embodiment of the present invention. The third embodiment is characterized by being configured to connect the first and second connection conduits (the cross conduits) via one communication passage (a bridge conduit) therebetween, and provide a valve device (a bridge valve) that establishes and blocks communication between the first and second connection conduits on the way of this communication passage. The third embodiment will be described, identifying similar components to the above-described first embodiment by the same reference numerals and omitting descriptions thereof.

Now, a communication passage 50 on the front side is a bridge conduit that establishes and blocks the communication between the first and second connection conduits 8 and 9 described in the first embodiment via a bridge valve 51 (i.e., a bridge device) therebetween. The bridge valve 51 is a valve provided between the first and second connection conduits 8 and 9 via the communication passage 50, and configured to establish and block the communication between the connection conduits 8 and 9 and mechanically adjust the flow amount of the hydraulic oil flowing between them according to the vibration frequency of the vehicle.

The bridge valve 51 includes a tube 52, a piston 53, and a rod 54. The tube 52 constitutes a part of the communication passage 50 provided between the first and second connection conduits 8 and 9, and is formed as a laterally extending cylindrical member. The piston 53 serves as a defining member provided by being fittedly inserted in this tube 52. The rod 54 holds this piston 53 in a fixed state in the tube 52. The piston 53 divides the inside of the tube 52 into two chambers 55 and 56 (hereinafter referred to as oil chambers 55 and 56), and, for example, the oil chamber 56 located on the left side of the piston 53 is constantly in communication with the first connection conduit 8 via the communication passage 50. Further, the oil chamber 55 located on the right side of the piston 53 is constantly in communication with the second connection conduit 9 via the communication passage 50.

Therefore, the hydraulic oil flows from the connection conduit 8 (for example, the upper chamber A of the hydraulic cylinder 1) into the oil chamber 56 in the tube 52, which keeps the connection conduit 8 and the oil chamber 56 in pressure states equivalent to each other. Further, the hydraulic oil flows from the connection conduit 9 (for example, the upper chamber A of the hydraulic cylinder 2) into the oil chamber 55 in the tube 52, which keeps the connection conduit 9 and the oil chamber 55 in pressure states equivalent to each other.

The bridge valve 51 includes first passages (for example, oil passages 53A and 53B and communication passages in valve seat members 61, 62, 71, and 72) and damping force generation mechanisms (a one-side damping force generation mechanism 60 and an opposite-side damping force generation mechanism 70). The hydraulic oil as the hydraulic fluid flows in the first passages due to the movements of the pistons 6 in the respective cylinders 5 of the left and right hydraulic cylinders 1 and 2 on the front wheel side (i.e., the extension and compression of the piston rods 7 from and into the cylinders 5). The damping force generation mechanisms include damping valves and back-pressure chambers 65 and 75. Each of the damping valves is disposed in the above-described first passage, and generates a damping force by restricting a flow of the above-described hydraulic oil. The back-pressure chambers 65 and 75 each apply the inner pressure thereof to this damping valve in the valve-closing direction. The back-pressure chambers 65 and 75 will be described below.

The above-described damping force generation mechanisms include back-pressure chamber inflow passages (for example, orifice holes 64C and 74C and communication passages 69 and 79). The back-pressure chamber inflow passages introduce the hydraulic oil (the hydraulic fluid) from the above-described first passages to the back-pressure chambers 65 and 75. The above-described damping valves include first valves (pressure control valves 64 and 74, which will be described below) and back-pressure chamber adjustment mechanisms. The first valves open and close the openings of the above-described first passages (the oil passages 53A and 53B) formed at the piston 53, and abut against the piston 53. The back-pressure chamber adjustment mechanisms adjust the inner pressures in the back-pressure chambers 65 and 75. These back-pressure chamber adjustment mechanisms include cylindrical case members (the valve seat members 62 and 72 and covers 66 and 76, which will be described below), and free pistons (free valves 67 and 77, which will be described below) disposed in the above-described case members.

Figure 12:
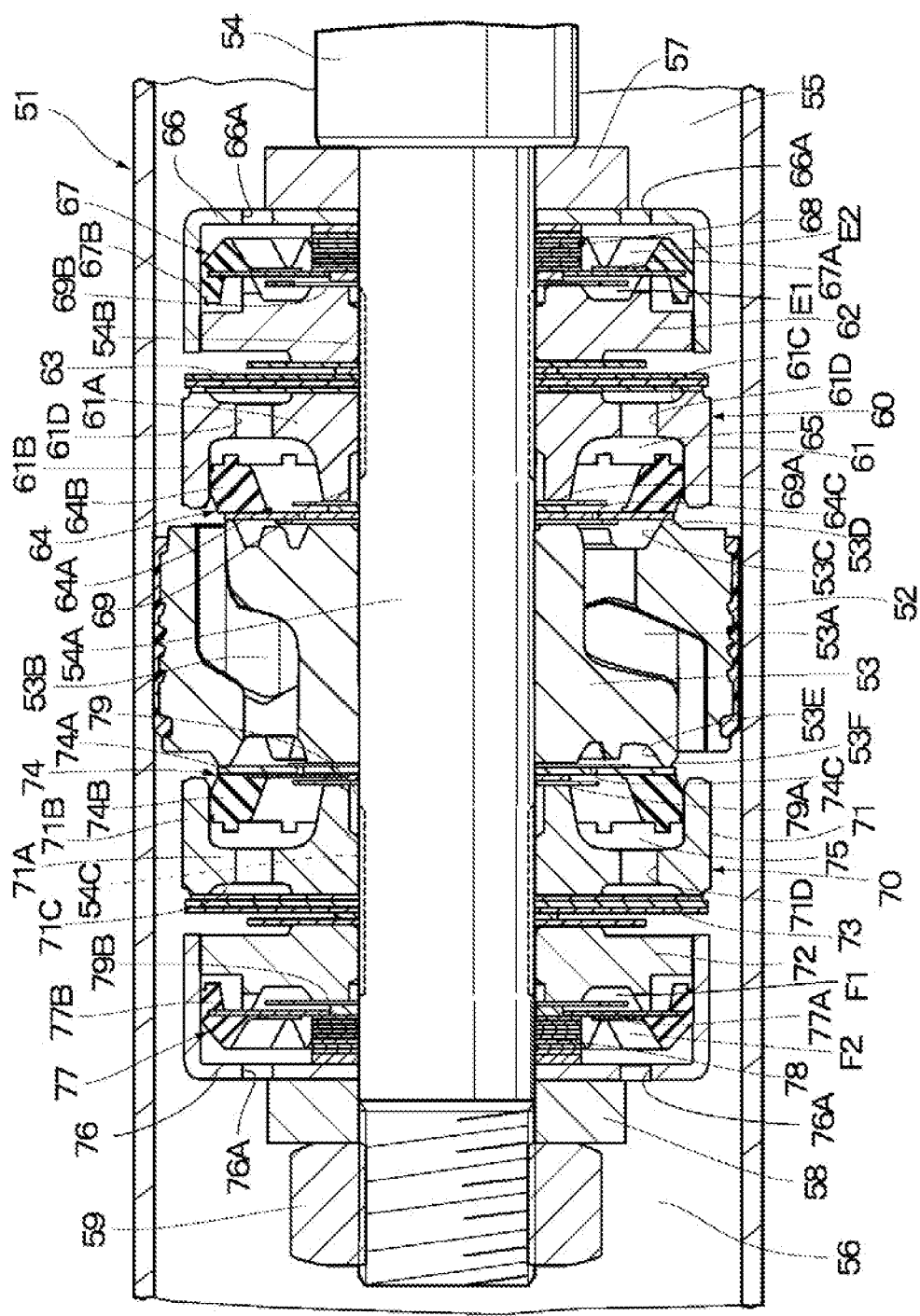
FIG. 12 is a vertical cross-sectional view illustrating the specific structure of a bridge valve illustrated in FIG. 11.
Figure 13:
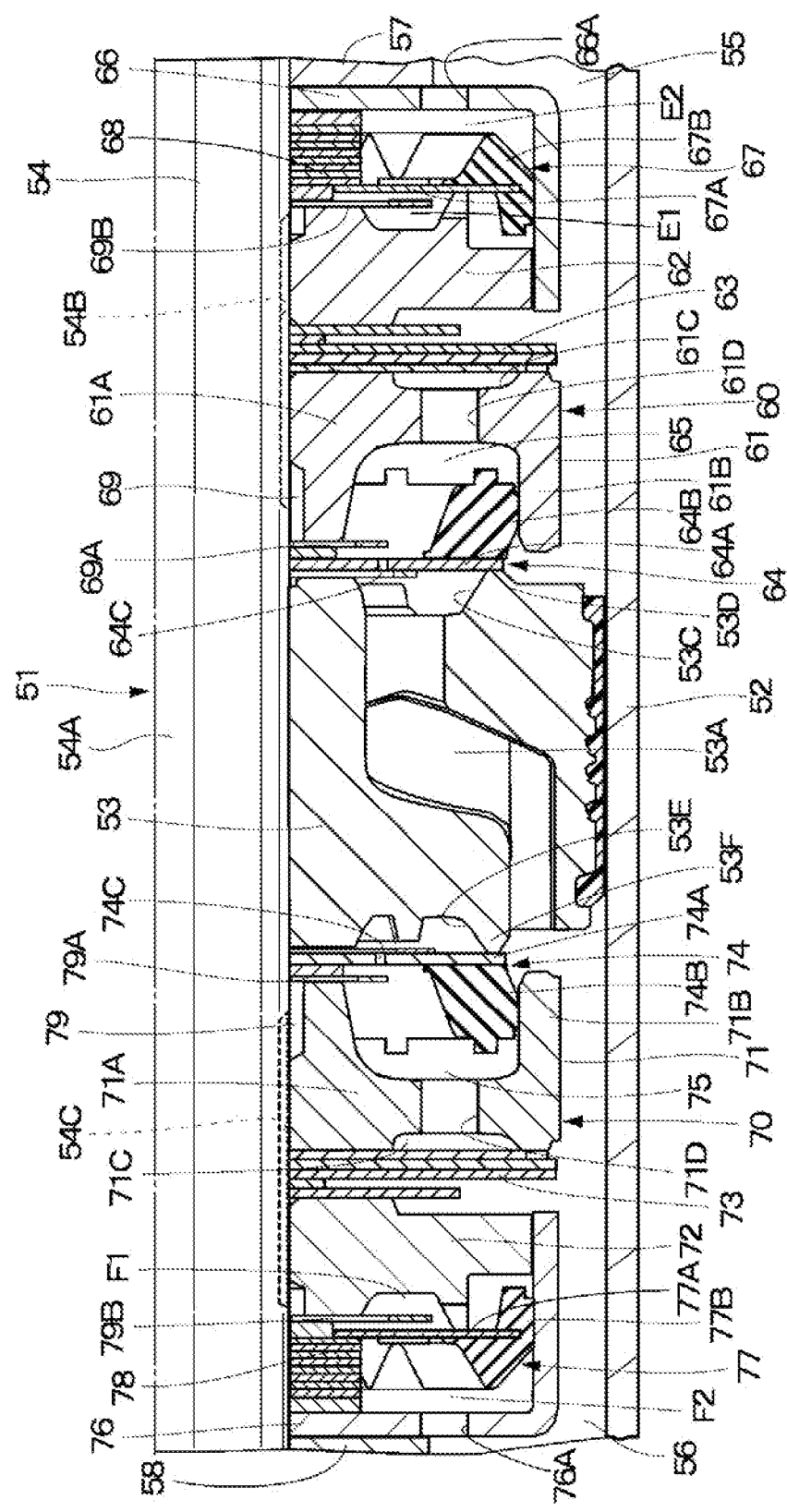
FIG. 13 is a half cross-sectional view illustrating the bridge valve illustrated in FIG. 12 in an enlarged manner.

As illustrated in FIGS. 12 and 13, a plurality of oil passages 53A and a plurality of oil passages 53B are each formed on the piston 53 so as to be circumferentially spaced apart from one another. The oil passages 53A and 53B can establish the communication between the oil chamber 55 and the oil chamber 56. These oil passages 53A and 53B constitute the first passages, in which the hydraulic oil flows between the two oil chambers 55 and 56 in the tube 52. An annular recessed portion 53C and an annular valve seat 53D are provided on the end surface of the piston 53 on one side (the right side) thereof. The annular recessed portion 53C is formed so as to surround the openings of the oil passages 53A on the one side. The annular valve seat 53D is positioned on the radially outer side of this annular recessed portion 53C. A main disk 64A, which will be described below, is seated on and separated from the annular valve seat 53D. An annular recessed portion 53E and an annular valve seat 53F are provided on the end surface of the piston 53 on the opposite side (the left side) thereof. The annular recessed portion 53E is formed so as to surround the openings of the oil passages 53B on the opposite side. The annular valve seat 53F is positioned on the radially outer side of this annular recessed portion 53E. The opposite-side damping force generation mechanism 70 (the main disk 64A), which will be described below, is seated on and separated from the annular valve seat 53F.

The rod 54 includes a small-diameter rod portion 54A extending from the one side to the opposite side in the lateral direction, and the piston 53 is fixed to this small-diameter rod portion 54A via spacers 57 and 58 and the damping force generation mechanisms 60 and 70 using a nut 59 in a fastened state. The one end side as the proximal end side of the rod 54 (the right end side in FIG. 12) is fixed in the tube 52 via a fixation tool (not illustrated) and the like. The oil chamber 55 is formed between the one side of the tube 52 and the rod 54, and is constantly in communication with the second connection conduit 9 illustrated in FIG. 11. The nut 59 serves to attach the piston 53 to the small-diameter rod portion 54A of the piston rod 54 in a threadably engaged state and also fix the one-side and opposite-side damping force generation mechanisms 60 and 70, which will be described below, on both the right and left surface sides of the piston 53 by fastening them in a detachably attachable manner.

A communication groove 54B is formed on the outer peripheral surface of the small-diameter rod portion 54A of the piston rod 54 so as to axially extend. The communication groove 54B is constantly in communication with the annular recessed portion 53C of the piston 53. This communication groove 54B is in communication with the back-pressure chamber 65 and a damper inner chamber E1 via oil introduction passages 69A and 69B, which will be described below, and constitutes a part of the back-pressure chamber inflow passage (i.e., the communication passage 69). The communication groove 54B constitutes a second passage formed inside the valve seat member 62 as the case member together with the damper inner chamber E1 and a damper outer chamber E2, which will be described below. Further, another communication groove 54C is formed on the outer peripheral surface of the small-diameter rod portion 54A so as to axially extend. The communication groove 54C is constantly in communication with the annular recessed portion 53E of the piston 53. This communication groove 54C is in communication with the back-pressure chamber 75 and a damper inner chamber F1 via oil introduction passages 79A and 79B, which will be described below, and constitutes a part of the back-pressure chamber inflow passage (i.e., the communication passage 79). The communication groove 54C constitutes a second passage formed inside the valve seat member 72 as the case member together with the damper inner chamber F1 and a damper outer chamber F2, which will be described below.

The one-side damping force generation mechanism 60 is attached to the one side of the piston 53 in a fixed state at a position in the oil chamber 55 of the tube 52 as illustrated in FIG. 12. The one-side damping force generation mechanism 60 serves to apply the resistance force to the hydraulic oil flowing from the oil chamber 56 toward the oil chamber 55 via each of the oil passages 53A and the annular recessed portion 53C of the piston 53 and the like to generate a one-side damping force according to a predetermined characteristic, during the stroke in which the hydraulic oil flows from the left side (the oil chamber 56) toward the right side (the oil chamber 55) of the piston 53.

Now, the one-side damping force generation mechanism 60 includes the two valve seat members 61 and 62, a relief valve 63, the pressure control valve 64, the free valve 67 (i.e., a second valve working as a frequency adaptive valve), which will be described below, and the like. The valve seat members 61 and 62 are fixed to the outer peripheral side of the rod 54 (the small-diameter rod portion 54A) at a position between the piston 53 and the spacer 18. The relief valve 63 is disposed between these valve seat members 61 and 62. The pressure control valve 64 corresponds to the first valve. The pressure control valve 64 includes an elastic seal member 64B, and corresponds to the first valve forming the annular back-pressure chamber 65 between the pressure control valve 64 and the valve seat member 61. The elastic seal member 64B is fitted to the inner peripheral side of the valve seat member (the inner peripheral surface of a short cylindrical portion 61B, which will be described below) with a tightening margin. The elastic seal member 64B will be described below.

The valve seat member 61 of the one-side damping force generation mechanism 60 includes an annular plate portion 61A, the short cylindrical portion 61B, the annular recessed portion 61C, and a plurality of through-holes 61D. The annular plate portion 61A is provided by being fitted to the outer peripheral side of the small-diameter rod portion 54A. The short cylindrical portion 61B is provided so as to extend from the outer peripheral side of this annular plate portion 61A to the opposite axial side to reach as far as a position close to the end surface of the piston 53 on the one side. An annular recessed portion 61C is formed on the one-side surface of the annular plate portion 61A, and is opened and closed by the relief valve 63. The through-holes 61D are formed by piercing a radially intermediate portion of the annular plate portion 61A so as to establish communication of the inside of the short cylindrical portion 61B with the inside of the annular recessed portion 61C, and are opened vertically.

The relief valve 63 is formed by, for example, a disk valve provided by being sandwiched between the valve seat members 61 and 62 on the outer peripheral side of the small-diameter rod portion 54A. The relief valve 63 usually closes the annular recessed portion 61C of the valve seat member 61. However, when the pressure in the back-pressure chamber 65 in communication with the inside of the annular recessed portion 61C via the through-holes 61D increases to the valve-opening set pressure of the relief valve 63 (a pressure higher than the valve-opening set pressure of the pressure control valve 64), the relief valve 63 is opened from the end surface of the valve seat member 61 and functions as a safety valve that relieves the excessive pressure at this time by releasing it to the oil chamber 55 side.

The pressure control valve 64 includes the main disk 64A and the annular elastic seal member 64B. The main disk 64A is seated onto and separated from the annular valve seat 53D of the piston 53. The elastic seal member 64B is provided by being fixedly attached to the outer peripheral portion of this main disk 64A on the one side thereof using a method such as vulcanization and baking. This elastic seal member 64B is formed into a thick ring shape with use of an elastic material such as rubber, and liquid-tightly seals the back-pressure chamber 65 on the inner side with respect to the outer oil chamber 55. The orifice hole 64C is formed at the main disk 64A. The orifice hole 64C is formed by a small hole that establishes communication of the inside of the annular recessed portion 53C of the piston 53 with the back-pressure chamber 65.

The pressure control valve 64 serves to generate a predetermined damping force with the main disk 64A thereof separated from the annular valve seat 53D when the pressure difference between the oil chamber 56 (the annular recessed portion 53C) and the back-pressure chamber 65 increases to the predetermined valve-opening set pressure, for example, during the stroke in which the hydraulic oil flows from the oil chamber 56 toward the oil chamber 55. When the pressure control valve 64 (the main disk 64A) is opened, the oil chamber 55 and the oil chamber 56 are in communication with each other via the oil passages 53A of the piston 53 therebetween.

On the other hand, when the pressure control valve 64 (the main disk 64A) is closed, for example, the hydraulic oil in the oil chamber 56 is introduced from the oil passages 53A and the annular recessed portion 53C of the piston 53 into the back-pressure chamber 65 via the orifice hole 64C of the main disk 64A. At this time, a pressure loss (a pressure difference) is generated between the annular recessed portion 53C of the piston 53 and the back-pressure chamber 65 due to the orifice hole 64C. The orifice hole 64C constitutes the back-pressure chamber inflow passage that introduces the hydraulic oil from the first passage (the oil passages 53A) to the back-pressure chamber 65.

The lidded cylindrical cover 66 is provided by being fitted to the valve seat member 62 of the one-side damping force generation mechanism 60, and the free valve 67 is provided between this cover 66 and the valve seat member 62 as the free piston (the second valve). This free valve 67 includes a disk valve 67A and an annular elastic seal member 67B. The disk valve 67A of the free valve 67 is mounted between the valve seat member 62 and the cover 66 via a plurality of valve seat disks 68 and the like, and is configured as a check valve member that is seated on and separated from the outer peripheral sides of the valve seat disks 68.

The elastic seal member 67B of the free valve 67 is provided by being fixedly attached to the outer peripheral side of the disk valve 67A using a method such as vulcanization and baking. This elastic seal member 67B is formed into a thick ring shape with use of an elastic material such as rubber, and is in liquid-tight contact with the inner peripheral surface of the cover 66 with a tightening margin. Due to this configuration, two chambers, the frequency adaptive damper inner chamber E1 and damper outer chamber E2 are defined by the free valve 67 between the valve seat member 62 and the cover 66. A plurality of vertically opened through-holes 66A is provided at the cover 66 so as to establish communication between the outer oil chamber 55 and the damper outer chamber E2.

The communication passage 69 is a passage that establishes constant communication between the damper inner chamber E1 and the back-pressure chamber 65. This communication passage 69 includes the first oil introduction passage 69A, the second oil introduction passage 69B, and the communication groove 54B of the small-diameter rod portion 54A. The first oil introduction passage 69A is formed between the main disk 64A of the pressure control valve 64 and the valve seat member 61, and extends radially toward the outer peripheral side of the small-diameter rod portion 54A. The second oil introduction passage 69B is formed between the disk valve 67A of the free valve 67 and the valve seat member 62, and extends radially toward the outer peripheral side of the small-diameter rod portion 54A.

The first oil introduction passage 69A is formed by, for example, a communication hole of an annular flat plate provided by being sandwiched between the main disk 64A of the pressure control valve 64 and the valve seat member 61, and is provided as a passage that establishes constant communication of the communication groove 54B of the small-diameter rod portion 54A with the back-pressure chamber 65. The second oil introduction passage 69B is formed by, for example, a communication hole of an annular flat plate provided by being sandwiched between the valve seat member 62 and the valve seat disks 68, and is provided as a passage that establishes constant communication of the communication groove 54B of the small-diameter rod portion 54A with the damper inner chamber E1 (a part of the second passage).

Then, the volume in the damper inner chamber E1 increases and reduces according to displacements (including elastic deformations) of the disk valve 67A and the elastic seal member 67B. Therefore, the free valve 67 is configured as the second valve that adjusts the pressure (the inner pressure) in the back-pressure chamber 65. The valve seat member 62 is provided by being fitted between the outer peripheral side of the small-diameter rod portion 54A and the inner peripheral side of the cover 66, and is sandwiched between the valve seat disks 68 and the relief valve 63 (the disk valve) with the aid of the fastening force from the nut 59.

For example, during the stroke in which the hydraulic oil flows from the oil chamber 56 toward the oil chamber 55, the hydraulic oil in the oil chamber 56 is introduced from the oil passages 53A and the annular recessed portion 53C of the piston 53 into the back-pressure chamber 65 via the orifice 64C of the main disk 64A, and this hydraulic oil is guided from the back-pressure chamber 65 into the damper inner chamber E1 via the communication passage 69 (the first oil introduction passage 69A, the communication groove 54B, and the second oil introduction passage 69B).

Therefore, the disk valve 67A of the free valve 67 as the check valve member is kept seated on the outer peripheral sides of the valve seat disks 68, and is relatively displaced so as to be moved laterally or stopped in the cover 66 according to the vibration frequency of the vehicle (for example, the piston rod 7 and/or the cylinder 5) in this state. Due to this configuration, the free valve 67 has a function of operating as the frequency adaptive valve that adjusts the inner pressure in the damper inner chamber E1 (i.e., the back-pressure chamber 65) according to the above-described frequency.

However, during the stroke in which the hydraulic oil flows from the oil chamber 55 toward the oil chamber 56 in the opposite manner, the damper outer chamber E2 has a higher pressure relative to the damper inner chamber E1, and therefore the free valve 67 is opened in such a manner that the disk valve 67A thereof as the check valve member is separated from the outer peripheral sides of the valve seat disks 68. As a result, the hydraulic oil (the hydraulic fluid) in the oil chamber 55 flows from the damper outer chamber E2 toward the back-pressure chamber 65 via the damper inner chamber E1 and the communication passage 69. Then, the hydraulic oil in the back-pressure chamber 65 flows from the annular recessed portion 53C and the oil passages 53A of the piston 53 via the orifice hole 64C of the main disk 64A toward the other oil chamber 56, and a relatively large damping force is generated, for example, when the hydraulic oil flows through the orifice hole 64C. The communication passage 69 constitutes the back-pressure chamber inflow passage that introduces the hydraulic oil into the back-pressure chamber 65 together with the communication groove 54B of the small-diameter rod portion 54A.

The opposite-side damping force generation mechanism 70 is attached to the opposite side of the piston 53 in a fixed state at a position in the oil chamber 56 of the tube 52 as illustrated in FIG. 12. The opposite-side damping force generation mechanism 70 serves to apply the resistance force to the hydraulic oil flowing from the oil chamber 55 toward the oil chamber 56 via each of the oil passages 53B and the annular recessed portion 53E of the piston 53 and the like to generate an opposite-side damping force according to a predetermined characteristic, during the stroke in which the hydraulic oil flows from the right side (the oil chamber 55) toward the left side (the oil chamber 56) of the piston 53.

Now, the opposite-side damping force generation mechanism 70 includes the two valve seat members 71 and 72, the relief valve 73, the pressure control valve 74, the free valve 77 (i.e., the second valve working as the frequency adaptive valve), which will be described below, and the like. The valve seat members 71 and 72 are fixed to the outer peripheral side of the rod 54 (the small-diameter rod portion 54A) at a position between the piston 53 and the spacer 58. The relief valve 73 is disposed between these valve seat members 71 and 72. The pressure control valve 74 corresponds to the first valve. The pressure control valve 74 includes an elastic seal member 74B, and corresponds to the first valve forming the annular back-pressure chamber 75 between the pressure control valve 74 and the valve seat member 71. The elastic seal member 74B is fitted to the inner peripheral side of the valve seat member 71 (the inner peripheral surface of a short cylindrical portion 71B, which will be described below) with a tightening margin. The elastic seal member 74B will be described below.

The valve seat member 71 of the opposite-side damping force generation mechanism 70 is configured in a similar manner to the valve seat member 61 of the one-side damping force generation mechanism 60, and includes an annular plate portion 71A, the short cylindrical portion 71B, an annular recessed portion 71C, and through-holes 71D. The relief valve 73 is provided by being sandwiched between the valve seat members 71 and 72 on the outer peripheral side of the small-diameter rod portion 54A. The relief valve 73 is configured in a similar manner to the relief valve 63 of the one-side damping force generation mechanism 60. Then, when the pressure in the back-pressure chamber 75 increases to the valve-opening set pressure of the relief valve 73 (a pressure higher than the valve-opening set pressure of the pressure control valve 74), the relief valve 73 functions as a safety valve that relieves the excessive pressure at this time by releasing it to the oil chamber 56 side.

The pressure control valve 74 is configured in a similar manner to the pressure control valve 64 of the one-side damping force generation mechanism 60, and includes a main disk 74A, the annular elastic seal member 74B, and the orifice hole 74C. The main disk 74A is seated on and separated from the annular valve seat 53F of the piston 53. The pressure control valve 74 serves to generate a predetermined damping force with the main disk 74A thereof separated from the annular valve seat 53F when the pressure difference between the oil chamber 55 (the annular recessed portion 53E) and the back-pressure chamber 75 increases to the predetermined valve-opening set pressure, for example, during the stroke in which the hydraulic oil flows from the oil chamber 55 toward the oil chamber 56. When the pressure control valve 74 (the main disk 74A) is opened, the oil chamber 55 and the oil chamber 56 are in communication with each other via the oil passages 53B of the piston 53 therebetween.

On the other hand, when the pressure control valve (the main disk 74A) is closed, for example, the hydraulic oil in the oil chamber 55 is introduced from the oil passages 53B and the annular recessed portion 53E of the piston 53 into the back-pressure chamber 75 via the orifice hole 74C of the main disk 74A. At this time, a pressure loss (a pressure difference) is generated between the annular recessed portion 53E of the piston 53 and the back-pressure chamber 75 due to the orifice hole 74C. The orifice hole 74C constitutes the back-pressure chamber inflow passage that introduces the hydraulic oil from the first passage (the oil passages 53B) to the back-pressure chamber 75.

A lidded cylindrical cover 76 is provided by being fitted to the valve seat member 72 of the opposite-side damping force generation mechanism 70, and the free valve 77 is provided between this cover 76 and the valve seat member 72 as the free piston (the second valve). This free valve 77 includes a disk valve 77A and an elastic seal member 77B similarly to the free valve 67 of the one-side damping force generation mechanism 60, and the disk valve 77A is configured as a check valve member that is seated on and separated from the outer peripheral sides of valve seat disks 78. Two chambers, the frequency adaptive damper inner chamber F1 and damper outer chamber F2 are defined by the free valve 77 between the valve seat member 72 and the cover 76. A plurality of vertically opened through-holes 76A is provided at the cover 76 so as to establish communication between the outer oil chamber 56 and the damper outer chamber F2.

The communication passage 79 is a passage that establishes constant communication between the damper inner chamber F1 and the back-pressure chamber 75. This communication passage 79 includes a first oil introduction passage 79A, a second oil introduction passage 79B, and a communication groove 54C of the small-diameter rod portion 54A. The first oil introduction passage 79A is formed between the main disk 74A of the pressure control valve 74 and the valve seat member 71, and extends radially toward the outer peripheral side of the small-diameter rod portion 54A. The second oil introduction passage 79B is formed between the disk valve 77A of the free valve 77 and the valve seat member 72, and extends radially toward the outer peripheral side of the small-diameter rod portion 54A.

The first oil introduction passage 79A is formed by, for example, a communication hole of an annular flat plate provided by being sandwiched between the main disk 74A of the pressure control valve 74 and the valve seat member 71, and establishes constant communication of the communication groove 54C of the small-diameter rod portion 54A with the back-pressure chamber 75. The second oil introduction passage 79B is formed by, for example, a communication hole of an annular flat plate provided by being sandwiched between the valve seat member 72 and the valve seat disks 78, and is provided as a passage that establishes constant communication of the communication groove 54C of the small-diameter rod portion 54A with the damper inner chamber F1 (a part of the second passage).

Then, the volume in the damper inner chamber F1 increases and reduces according to displacements (including elastic deformations) of the disk valve 77A and the elastic seal member 77B. Therefore, the free valve 77 is configured as the second valve that adjusts the pressure (the inner pressure) in the back-pressure chamber 75. The valve seat member 72 is provided by being fitted between the outer peripheral side of the small-diameter rod portion 54A and the inner peripheral side of the cover 76, and is sandwiched between the valve seat disks 78 and the relief valve 73 (the disk valve) with the aid of the fastening force from the nut 59.

For example, during the stroke in which the hydraulic oil flows from the oil chamber 55 toward the oil chamber 56, the hydraulic oil in the oil chamber 55 is introduced from the oil passages 53B and the annular recessed portion 53E of the piston 53 into the back-pressure chamber 75 via the orifice 74C of the main disk 74A, and this hydraulic oil is guided from the back-pressure chamber 75 into the damper inner chamber F1 via the communication passage 79 (the first oil introduction passage 79A, the communication groove 54C, and the second oil introduction passage 79B).

Therefore, the disk valve 77A of the free valve 77 as the check valve member is kept seated on the outer peripheral side of the valve seat disks 78, and is relatively displaced so as to be moved laterally or stopped in the cover 76 according to the vibration frequency of the vehicle (for example, the piston rod 7 and/or the cylinder 5) in this state. Due to this configuration, the free valve 77 has a function of operating as the frequency adaptive valve that adjusts the inner pressure in the damper inner chamber F1 (i.e., the back-pressure chamber 75) according to the above-described frequency.

However, during the stroke in which the hydraulic oil flows from the oil chamber 56 toward the oil chamber 55 in the opposite manner, the damper outer chamber F2 has a higher pressure relative to the damper inner chamber F1, and therefore the free valve 77 is opened in such a manner that the disk valve 77A thereof as the check valve member is separated from the outer peripheral sides of the valve seat disks 78. As a result, the hydraulic oil (the hydraulic fluid) in the oil chamber 56 flows from the damper outer chamber F2 toward the back-pressure chamber 75 via the damper inner chamber F1 and the communication passage 79. Then, the hydraulic oil in the back-pressure chamber 75 flows from the annular recessed portion 53E and the oil passages 53B of the piston 53 via the orifice hole 74C of the main disk 74A toward the other oil chamber 55, and a relatively large damping force is generated, for example, when the hydraulic oil flows through the orifice hole 74C. The communication passage 79 constitutes the back-pressure chamber inflow passage that introduces the hydraulic oil into the back-pressure chamber 75 together with the communication groove 54C of the small-diameter rod portion 54A.

Figure 11:
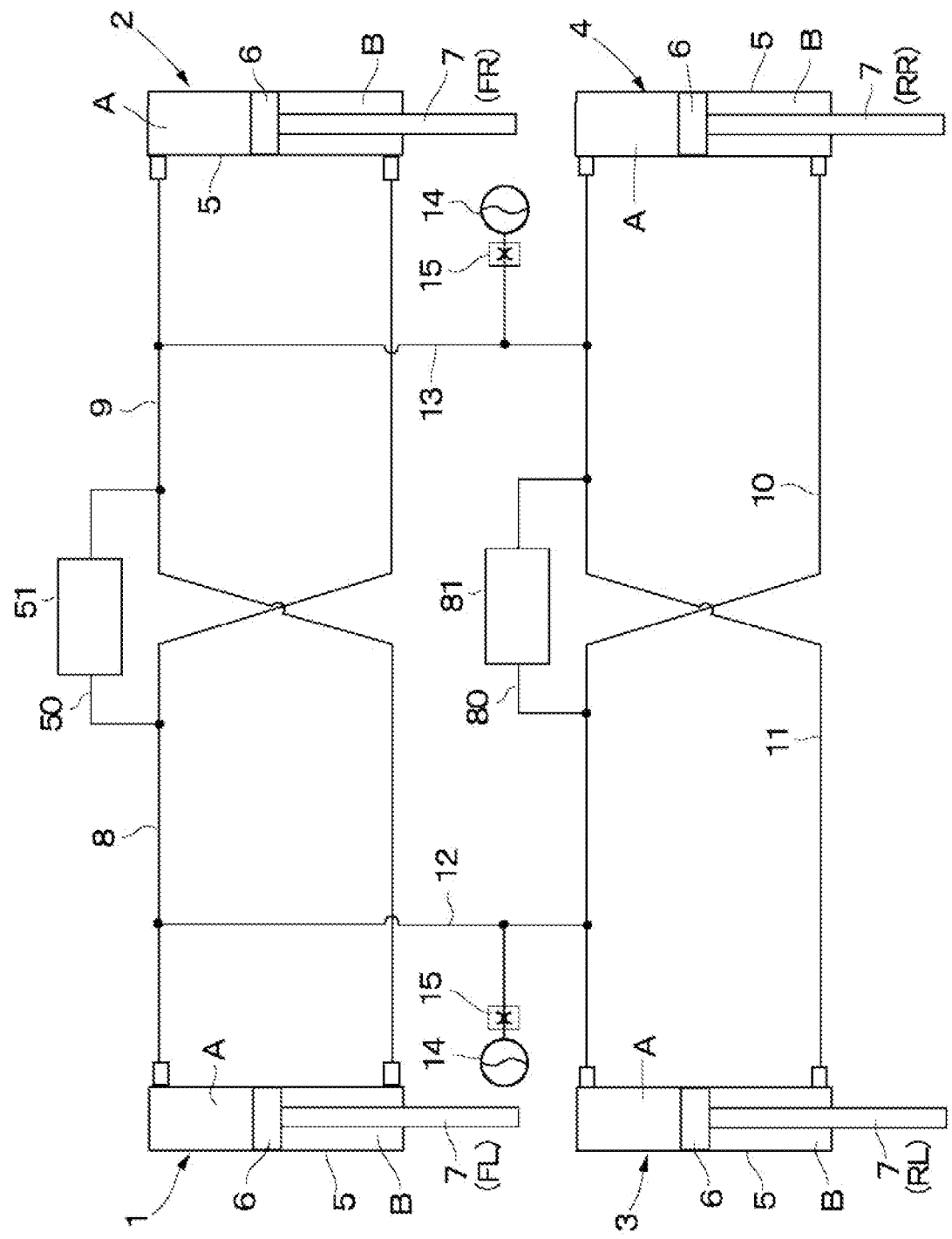
FIG. 11 illustrates the overall configuration of a suspension apparatus according to a third embodiment.

In FIG. 11, a communication passage 80 on the rear side and a bridge valve 81 are provided between the first and second connection conduits 10 and 11 on the rear side. The communication passage 80 corresponds to the bridge conduit, and the bridge valve 81 corresponds to the valve device. The bridge valve 81 is provided between the first and second connection conduits 10 and 11 via the communication passage 80, and establishes and blocks communication between the first and second connection conduits 10 and 11, for example, on the way of the communication passage 80. The bridge valve 81 constitutes a valve that mechanically adjusts the flow amount of the hydraulic oil flowing between the connection conduits 10 and 11 on the rear side according to the vibration frequency of the vehicle. The bridge valve 81 includes damping force generation mechanisms similarly to the above-described bridge valve 51 (i.e., the one-side damping force generation mechanism 60 and the opposite-side damping force generation mechanism 70), and a further description thereof will be omitted herein to avoid the redundancy of the description.

The suspension apparatus according to the third embodiment is configured in the above-described manner, and the operation thereof will be described next.

Focusing on the bridge valve 51 by way of example, the disk valve 77A of the free valve 77 is opened so as to be separated from the outer peripheral sides of the valve seat disks 78 when the hydraulic oil flows from the oil chamber 56 (the first connection conduit 8) toward the oil chamber 55 (the second connection conduit 9). As a result, the hydraulic oil (the hydraulic fluid) in the oil chamber 56 flows from the damper outer chamber F2 toward the back-pressure chamber 75 via the damper inner chamber F1 and the communication passage 79. Further, the hydraulic oil in the oil chamber 56 is introduced from the oil passages 53A and the annular recessed portion 53C of the piston 53 into the back-pressure chamber 65 via the orifice hole 64C of the main disk 64A. When the pressure control valve 64 is closed, the back-pressure chamber 65 is in communication with the inside of the damper inner chamber E1 of the free valve 67 via the communication passage 69, and therefore a pressure similar to the back-pressure chamber 65 also works in the damper inner chamber E1 of the free valve 67.

Figure 14:
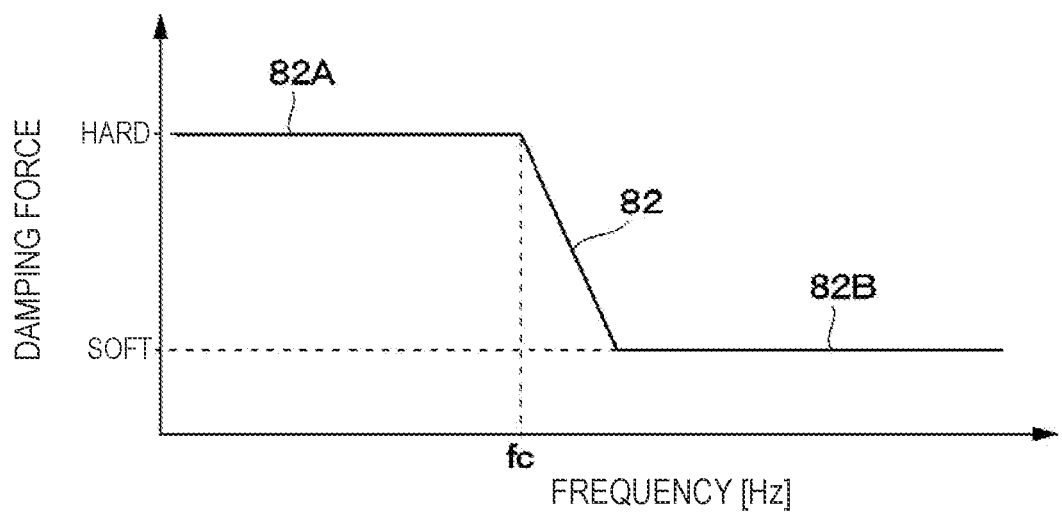
FIG. 14 illustrates a characteristic line representing the relationship between a damping force generated on the bridge valve and the vibration frequency.

At this time, the free valve 67 operates as the frequency adaptive valve that adjusts the pressure in the damper inner chamber E1 (the back-pressure chamber 65) according to the vibration frequency of the vehicle, and the pressure control valve 64 is kept closed until the vibration frequency reaches a cutoff frequency fc illustrated in FIG. 14. During that, the hydraulic oil in the back-pressure chamber 75 flows from the annular recessed portion 53E and the oil passages 53B of the piston 53 via the orifice hole 74C of the main disk 74A toward the other oil chamber 55, and a relatively large damping force is generated, for example, when the hydraulic oil flows through the orifice hole 74C. In other words, the damping force characteristic of the bridge valve 51 is set to the hard state as seen from a characteristic line portion 82A of a characteristic line 82 illustrated in FIG. 14.

However, when the vibration frequency of the vehicle increases over the cutoff frequency fc, the pressure in the damper inner chamber E1 reduces due to the free valve 67 and the pressure in the back-pressure chamber 65 also reduces according thereto. Therefore, the pressure control valve 64 is opened and the hydraulic oil from the first connection conduit 8 (the oil chamber 56) flows toward the oil chamber 55 (the second connection conduit 9) via the pressure control valve 64. At this time, the damping force characteristic of the bridge valve 51 is set to the soft state as seen from a characteristic line portion 82B illustrated in FIG. 14.

Next, when the hydraulic oil flows from the oil chamber 55 (the second connection conduit 9) toward the oil chamber 56 (the first connection conduit 8), the disk valve 67A of the free valve 67 is opened so as to be separated from the outer peripheral sides of the valve seat disks 68. As a result, the hydraulic oil (the hydraulic fluid) in the oil chamber 55 flows from the damper outer chamber E2 toward the back-pressure chamber 65 via the damper inner chamber E1 and the communication passage 69. Further, the hydraulic oil in the oil chamber 55 is introduced from the oil passages 53B and the annular recessed portion 53E of the piston 53 into the back-pressure chamber 75 via the orifice hole 74C of the main disk 74A. When the pressure control valve 74 is closed, the back-pressure chamber 75 is in communication with the inside of the damper inner chamber F1 of the free valve 77 via the communication passage 79, and therefore a pressure similar to the back-pressure chamber 75 also works in the damper inner chamber F1 of the free valve 77.

At this time, the free valve 77 operates as the frequency adaptive valve that adjusts the pressure in the damper inner chamber F1 (the back-pressure chamber 75) according to the vibration frequency of the vehicle, and the pressure control valve 74 is kept closed until the vibration frequency reaches the cutoff frequency fc illustrated in FIG. 14. During that, the hydraulic oil in the back-pressure chamber 65 flows from the annular recessed portion 53C and the oil passages 53A of the piston 53 via the orifice hole 64C of the main disk 64A toward the other oil chamber 56, and a relatively large damping force is generated, for example, when the hydraulic oil flows through the orifice hole 64C. In other words, the damping force characteristic of the bridge valve 51 is set to the hard state as seen from the characteristic line portion 82A of the characteristic line 82 illustrated in FIG. 14.

However, when the vibration frequency of the vehicle increases over the cutoff frequency fc, the pressure in the damper inner chamber F1 reduces due to the free valve 77 and the pressure in the back-pressure chamber 75 also reduces according thereto. Therefore, the pressure control valve 74 is opened and the hydraulic oil from the second connection conduit 9 (the oil chamber 55) flows toward the oil chamber 56 (the first connection conduit 8) via the pressure control valve 74. At this time, the damping force characteristic of the bridge valve 51 is set to the soft state as seen from the characteristic line portion 82B illustrated in FIG. 14.

The bridge valve 81 (the valve device) provided between the first and second connection conduits 10 and 11 on the rear side via the communication passage 80 also operates in a similar manner to the bridge valve 51 on the front side, and the damping force characteristic of the bridge valve 81 can also be variably adjusted according to the vibration frequency of the vehicle in a similar manner to the characteristic line 82 illustrated in FIG. 14.

Figure 15:
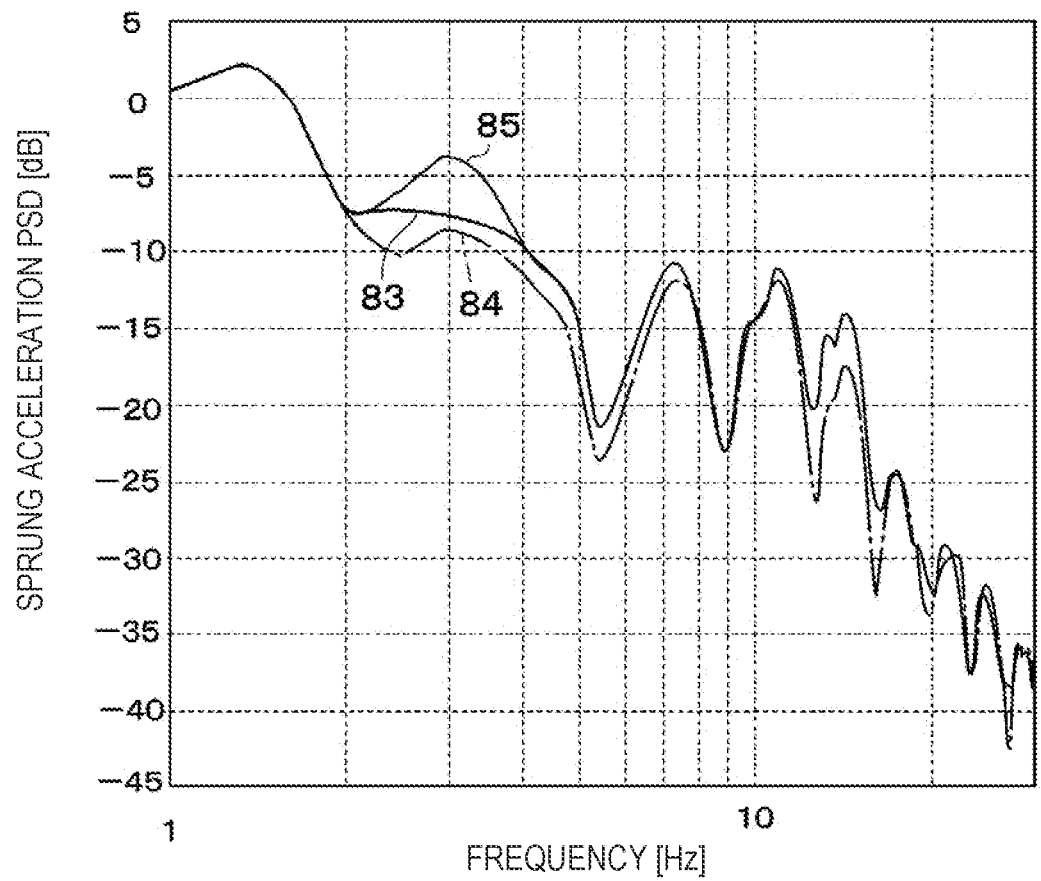
FIG. 15 illustrates characteristic lines each representing the characteristic of the vertical acceleration on the sprung side of the automobile with respect to the vibration frequency.

Now, FIG. 15 illustrates a vehicle simulation result when the suspension apparatus according to the third embodiment is applied to an actual vehicle. FIG. 15 illustrates a simulation in which the ride comfort on the vehicle is evaluated when the vehicle run on a bad-conditioned road at, for example, 60 km/h. A characteristic line 83 indicated by a solid line in FIG. 15 represents the PSD value of the sprung acceleration according to the present embodiment as the relationship with the vibration frequency. A characteristic line 84 indicated by a long dashed short dashed line in FIG.

15 represents the characteristic when the bridge valve is added and is controlled by the electronic control.

On the other hand, a characteristic line 85 in FIG. 15 represents the PSD value of the sprung acceleration according to the existing suspension system neither equipped with the bridge valve nor performing the electronic control as the relationship with the vibration frequency. It can be confirmed that, as seen from the characteristic line 83 indicated by the solid line in FIG. 15, the suspension apparatus according to the present embodiment is able to improve the ride comfort on the vehicle compared to the conventional technique (the characteristic line 85), and is able to achieve ride comfort closer to the ride comfort level of the characteristic line 84 using the electronic control by the mechanical valve device 81 (for example, the frequency adaptive free valve 77) even without relying on the electronic control.

In this manner, according to the thus-configured third embodiment, the suspension apparatus can also improve the problem with the existing suspension system (for example, the unsatisfactory ride comfort on the bad-conditioned road) by mechanically adjusting the flow amount of the hydraulic oil according to the vibration frequency of the vehicle, thereby improving the ride comfort on the vehicle at low cost while avoiding the complication of the system without relying on the electronic control.

In each of the above-described exemplary embodiments, the suspension apparatus has been described referring to the example in which the pair of left and right hydraulic cylinders 1 and 2 disposed between the left and right wheels and the vehicle body are connected to each other via the first and second connection conduits 8 and 9 in the cross manner. However, the present invention is not limited thereto, and the suspension apparatus may be configured in such a manner that, for example, on a two-wheeled vehicle, a pair of front and rear hydraulic (oil pressure) cylinders disposed between front and rear wheels and a vehicle body are connected to each other via the first and second connection conduits in a cross manner.

Further, in each of the above-described embodiments, the suspension apparatus has been described as being configured in such a manner that the piston rod 7 protrudes downward from the cylinder 5 of each of the hydraulic cylinders 1 to 4 by way of example. However, the present invention is not limited thereto, and the suspension apparatus may be configured in such a manner that, for example, the piston rod of each of the hydraulic cylinders protrudes upward from the cylinder.

Possible configurations as a suspension apparatus covered by the above-described embodiments include the following examples.

As a first configuration of the suspension apparatus, this suspension apparatus includes a pair of hydraulic cylinders disposed between left and right wheels and a vehicle body or a pair of hydraulic cylinders disposed between front and rear wheels and a vehicle body with an inside of each of the cylinders divided into an upper chamber and a lower chamber by a piston, a first connection conduit connecting the pair of hydraulic cylinders therebetween in a cross manner in such a manner that the upper chamber of one of the hydraulic cylinders is in communication with the lower chamber of the other of the hydraulic cylinders, a second connection conduit connecting the pair of hydraulic cylinders therebetween in a cross manner in such a manner that the upper chamber of the other of the hydraulic cylinders is in communication with the lower chamber of the one of the hydraulic cylinders, and a valve device provided between the upper chamber and the lower chamber of each of the hydraulic cylinders and configured to establish and block communication between the upper chamber and the lower chamber or provided between the first connection conduit and the second connection conduit and configured to establish and block communication between the first connection conduit and the second connection conduit. The valve device includes a first passage configured to allow hydraulic fluid to flow therein due to a movement of the piston, and a damping force generation mechanism including a damping valve and a back-pressure chamber. The damping valve is disposed in the first passage and configured to generate a damping force by restricting a flow of the hydraulic fluid generated due to a sliding movement of the piston. The back-pressure chamber is configured to apply an inner pressure thereof to this damping valve in a valve-closing direction. The damping force generation mechanism includes a back-pressure chamber inflow passage configured to introduce the hydraulic fluid from the first passage into the back-pressure chamber. The damping valve includes a first valve configured to open and close an opening of the first passage and abut against the piston, and a back-pressure chamber adjustment mechanism configured to adjust the inner pressure in the back-pressure chamber. The back-pressure chamber adjustment mechanism includes a cylindrical case member and a free piston. The cylindrical case member is arranged with at least a part of a second passage formed therein. The free piston is disposed in the case member and divides an inside of the case member into two chambers. One of the two chambers is in communication with the back-pressure chamber, and the free piston blocks at least a flow toward one side in the second passage.

As a second configuration of the suspension apparatus, the first configuration may be configured in such a manner that a first orifice making an orifice area different between an extension stroke and a compression stroke and a second orifice making the orifice area different between the extension stroke and the compression stroke are provided in the back-pressure chamber inflow passage.

As a third configuration of the suspension apparatus, in the second configuration, an orifice area of the first orifice may be larger than the second orifice.

As a fourth configuration of the suspension apparatus, the third configuration may be configured in such a manner that the second orifice includes a disk, the disk is opened during the extension stroke, and the disk is closed as a check valve member during the compression stroke.

As a fifth configuration of the suspension apparatus, in the first configuration, the first passage, the damping valve, the back-pressure chamber, and the damping force generation mechanism may be provided in the case member.

The present invention is not limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-102703 filed on May 29, 2018. The entire disclosure of Japanese Patent Application No. 2018-102703 filed on May 29, 2018 including the specification, the claims, the drawings, and the abstract is incorporated herein by reference in its entirety.

REFERENCE SIGN LIST 1, 2, 3, 4 hydraulic cylinder (fluid pressure cylinder)
5 cylinder
6 piston
6A, 6B oil passage (first passage)
7 piston rod
7B, 54B, 54C communication groove
8, 10 first connection conduit
9, 11 second connection conduit
16 valve device
21 extension-side damping force generation mechanism (damping force generation mechanism)
22 cylindrical case member (case member)
23, 65, 75 back-pressure chamber
24, 64, 74 pressure control valve (first valve)
25, 67, 77 free valve (free piston, back-pressure chamber adjustment mechanism)
28, 29 disk
31 back-pressure chamber inflow passage
51, 81 bridge valve (valve device)
52 tube
53 piston
53A, 53B oil passage (first passage)
55, 56 oil chamber
60 one-side damping force generation mechanism (damping force generation mechanism)
62, 72 valve seat member (case member)
66, 76 cover (case member)
64C, 74C orifice hole (back-pressure chamber inflow passage)
69, 79 communication passage (back-pressure chamber inflow passage)
70 opposite-side damping force generation mechanism (damping force generation mechanism)
A upper chamber
A1 damper upper chamber
B lower chamber
B1 damper lower chamber
E1, F1 damper inner chamber
B2, F2 damper outer chamber
Sr first orifice
Sc second orifice

The invention claimed is:

1. A suspension apparatus comprising:
a pair of hydraulic cylinders disposed between left and right wheels and a vehicle body or a pair of hydraulic cylinders disposed between front and rear wheels and the vehicle body, an inside of each of the cylinders being divided into an upper chamber and a lower chamber by a piston;
a first connection conduit that connects the pair of hydraulic cylinders therebetween in a cross manner in such a manner that the upper chamber of one of the hydraulic cylinders is in communication with the lower chamber of the other of the hydraulic cylinders;
a second connection conduit that connects the pair of hydraulic cylinders therebetween in a cross manner in such a manner that the upper chamber of the other of the hydraulic cylinders is in communication with the lower chamber of the one of the hydraulic cylinders; and
a valve device provided between the upper chamber and the lower chamber of each of the hydraulic cylinders and configured to establish and block communication between the upper chamber and the lower chamber or provided between the first connection conduit and the second connection conduit and configured to establish and block communication between the first connection conduit and the second connection conduit,
wherein the valve device includes
a first passage configured to allow hydraulic fluid to flow therein due to a movement of the piston, and
a damping force generation mechanism including a damping valve and a back-pressure chamber, the damping valve being disposed in the first passage and configured to generate a damping force by restricting a flow of the hydraulic fluid generated due to a sliding movement of the piston, the back-pressure chamber being configured to apply an inner pressure thereof to the damping valve in a valve-closing direction,
wherein the damping force generation mechanism includes a back-pressure chamber inflow passage configured to introduce the hydraulic fluid from the first passage into the back-pressure chamber,
wherein the damping valve includes
a first valve configured to open and close an opening of the first passage, and
a back-pressure chamber adjustment mechanism configured to adjust the inner pressure in the back-pressure chamber,
wherein the back-pressure chamber adjustment mechanism includes a cylindrical case member and a free piston, the cylindrical case member being arranged with at least a part of a second passage formed therein, the free piston being disposed in the case member and dividing an inside of the case member into two chambers, and
wherein one of the two chambers is in communication with the back-pressure chamber, and the free piston is capable of blocking a flow in the second passage,
wherein a first orifice and a second orifice are provided in the back-pressure chamber inflow passage, the first orifice making an orifice area different between an extension stroke and a compression stroke, the second orifice making the orifice area different between the extension stroke and the compression stroke.

2. The suspension apparatus according to claim 1, wherein the orifice area of the first orifice is larger than the orifice area of the second orifice.

3. The suspension apparatus according to claim 2, wherein the second orifice includes a disk,
wherein the disk is opened during the extension stroke, and
wherein the disk is closed as a check valve member during the compression stroke.

4. The suspension apparatus according to claim 1, wherein the first passage, the damping valve, the back-pressure chamber, and the damping force generation mechanism are provided in the case member.

* * * * *